United States Patent
Mordani et al.

(10) Patent No.: US 10,454,788 B2
(45) Date of Patent: Oct. 22, 2019

(54) SYSTEM AND METHOD FOR SUPPORTING MULTITENANCY IN A CLOUD PLATFORM ENVIRONMENT

(71) Applicant: ORACLE INTERNATIONAL CORPORATION, Redwood Shores, CA (US)

(72) Inventors: Rajiv Mordani, Sunnyvale, CA (US); Nazrul Islam, Santa Clara, CA (US); Sivakumar Thyagarajan, Bangalore (IN); Bhavanishankara Sapaliga, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 402 days.

(21) Appl. No.: 14/478,984

(22) Filed: Sep. 5, 2014

(65) Prior Publication Data
US 2015/0120938 A1  Apr. 30, 2015

Related U.S. Application Data

(60) Provisional application No. 61/897,656, filed on Oct. 30, 2013.

(51) Int. Cl.
*H04L 12/24* (2006.01)

(52) U.S. Cl.
CPC ...... *H04L 41/5041* (2013.01); *H04L 41/5054* (2013.01)

(58) Field of Classification Search
CPC ........... G06F 2209/548; H04L 41/5041; H04L 41/5054
See application file for complete search history.

(56) References Cited

U.S. PATENT DOCUMENTS 9,069,599 B2 *  6/2015  Martinez ................. G06F 9/455
9,336,060 B2 *  5/2016  Nori ....................... G06F 9/5066
(Continued)

OTHER PUBLICATIONS

United States Patent and Trademark Office, Office Action dated Nov. 1, 2016 for U.S. Appl. No. 14/476,561, 11 Pages.
(Continued)

*Primary Examiner* — Ranodhi Serrao
(74) *Attorney, Agent, or Firm* — Tucker Ellis LLP

(57) ABSTRACT

In accordance with an embodiment, described herein is a system and method for providing multitenancy support in a platform as a service or cloud computing environment. A platform component enables a service runtime to be shared by multiple tenants, by providing each tenant with a dedicated share or slice of a runtime instance. Each share/slice can be isolated from other shares/slices with respect to factors such as, for example, configuration, or quality of service. In accordance with an embodiment, during provisioning of a particular service runtime, a runtime definition associated with the service runtime can be utilized, for example by a service management engine, to configure the platform component to install one or more services within the service runtime. A particular service and its service runtimes can also be provisioned, within one or more runtime pools, according to a service runtime definition and placement configuration.

20 Claims, 21 Drawing Sheets

(56) References Cited

U.S. PATENT DOCUMENTS

| | | | |
|---|---|---|---|
| 2004/0225952 A1* | 11/2004 | Brown | G06F 8/20 |
| | | | 714/819 |
| 2009/0288084 A1 | 11/2009 | Astete | |
| 2011/0153824 A1 | 6/2011 | Chikando | |
| 2011/0265164 A1 | 10/2011 | Lucovsky et al. | |
| 2012/0054626 A1 | 3/2012 | Odenheimer | |
| 2012/0185913 A1* | 7/2012 | Martinez | G06F 9/455 |
| | | | 726/1 |
| 2012/0239792 A1 | 9/2012 | Banerjee | |
| 2012/0324069 A1* | 12/2012 | Nori | H04L 41/0806 |
| | | | 709/222 |
| 2013/0179574 A1 | 7/2013 | Calder | |
| 2013/0212576 A1 | 8/2013 | Huang et al. | |
| 2013/0263120 A1 | 10/2013 | Patil | |
| 2015/0074279 A1 | 3/2015 | Maes | |
| 2015/0113144 A1 | 4/2015 | Bauer | |

OTHER PUBLICATIONS

Office Action issued by United States Patent and Trademark Office for U.S. Appl. No. 14/478,977, dated Aug. 25, 2016 (12 pages).

Judith M. Myerson. "The Complete Book of Middleware". Auebach Publications: CRC Press. pp. 113-156 (chapter 5), plus 2 pages of front matter. 2002 (month unknown) (46 pages).

United States Patent and Trademark Office, Office Action dated Jun. 12, 2017, for U.S. Appl. No. 14/478,977, 14 Pages.

United States Patent and Trademark Office, Office Action dated Jul. 14, 2017 for U.S. Appl. No. 14/476,561, 10 Pages.

United States Patent and Trademark Office, Office Action dated Nov. 6, 2018 for U.S. Appl. No. 14/476,561, 14 Pages.

United States Patent and Trademark Office, Office Action dated Jan. 25, 2018 for U.S. Appl. No. 14/476,561, 15 Pages.

\* cited by examiner

SYSTEM AND METHOD FOR SUPPORTING MULTITENANCY IN A CLOUD PLATFORM ENVIRONMENT

CLAIM OF PRIORITY

This application claims the benefit of priority to U.S. Provisional Application titled "SYSTEM AND METHOD FOR SUPPORTING MULTITENANCY IN A CLOUD PLATFORM ENVIRONMENT", Application No. 61/897,656, filed Oct. 30, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF INVENTION

Embodiments of the invention are generally related to cloud computing, and providing of services within such environments, and are particularly related to a system and method for supporting multitenancy in a platform as a service or cloud computing environment.

BACKGROUND

A cloud computing environment enables responsibilities which previously may have been provided by an organization's own information technology department, to be delivered as service layers within a cloud environment, for use by consumers that are either internal (i.e., private) or external (i.e., public) to the organization. In some instances, a cloud environment may be intended for use by multiple tenants, which may have their own particular requirements or restrictions as to how services such be configured. These are examples of the types of environment in which embodiments of the invention can be used.

SUMMARY

In accordance with an embodiment, described herein is a system and method for providing multitenancy support in a platform as a service or cloud computing environment. A platform component enables a service runtime to be shared by multiple tenants, by providing each tenant with a dedicated share or slice of a runtime instance. Each share/slice can be isolated from other shares/slices with respect to factors such as, for example, configuration, or quality of service. In accordance with an embodiment, during provisioning of a particular service runtime, a runtime definition associated with the service runtime can be utilized, for example by a service management engine, to configure the platform component to install one or more services within the service runtime. A particular service and its service runtimes can also be provisioned, within one or more runtime pools, according to a service runtime definition and placement configuration.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
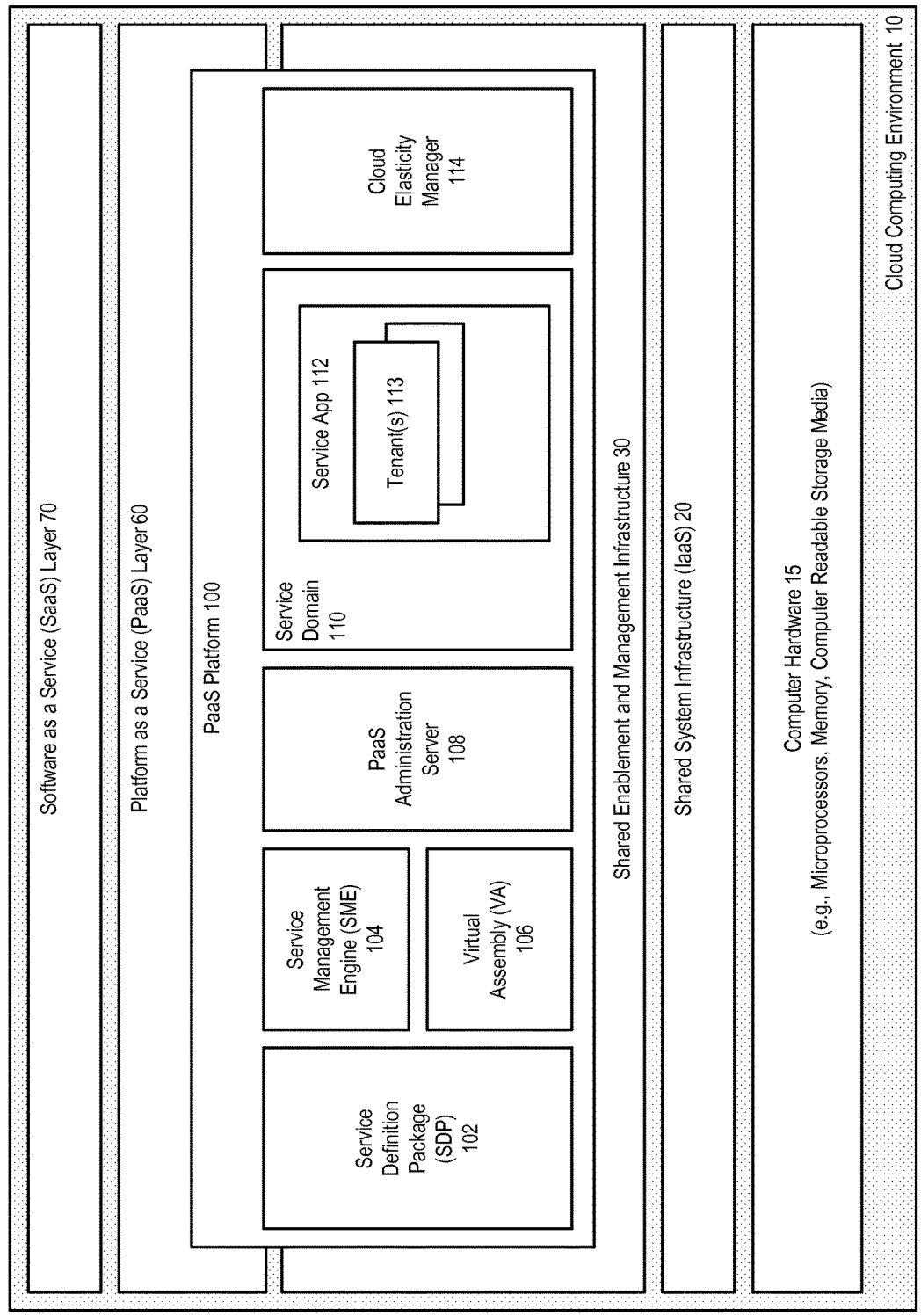
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
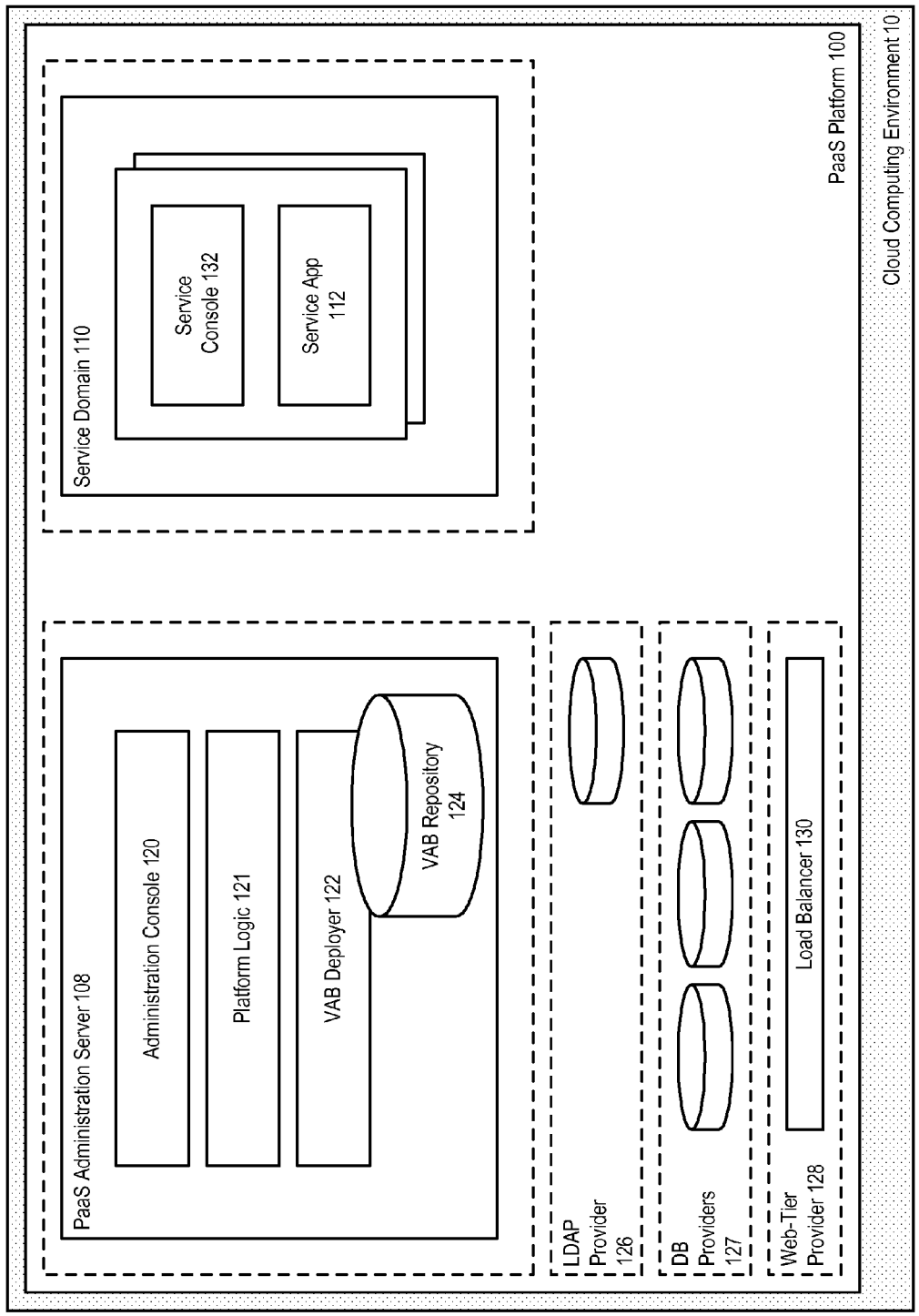
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
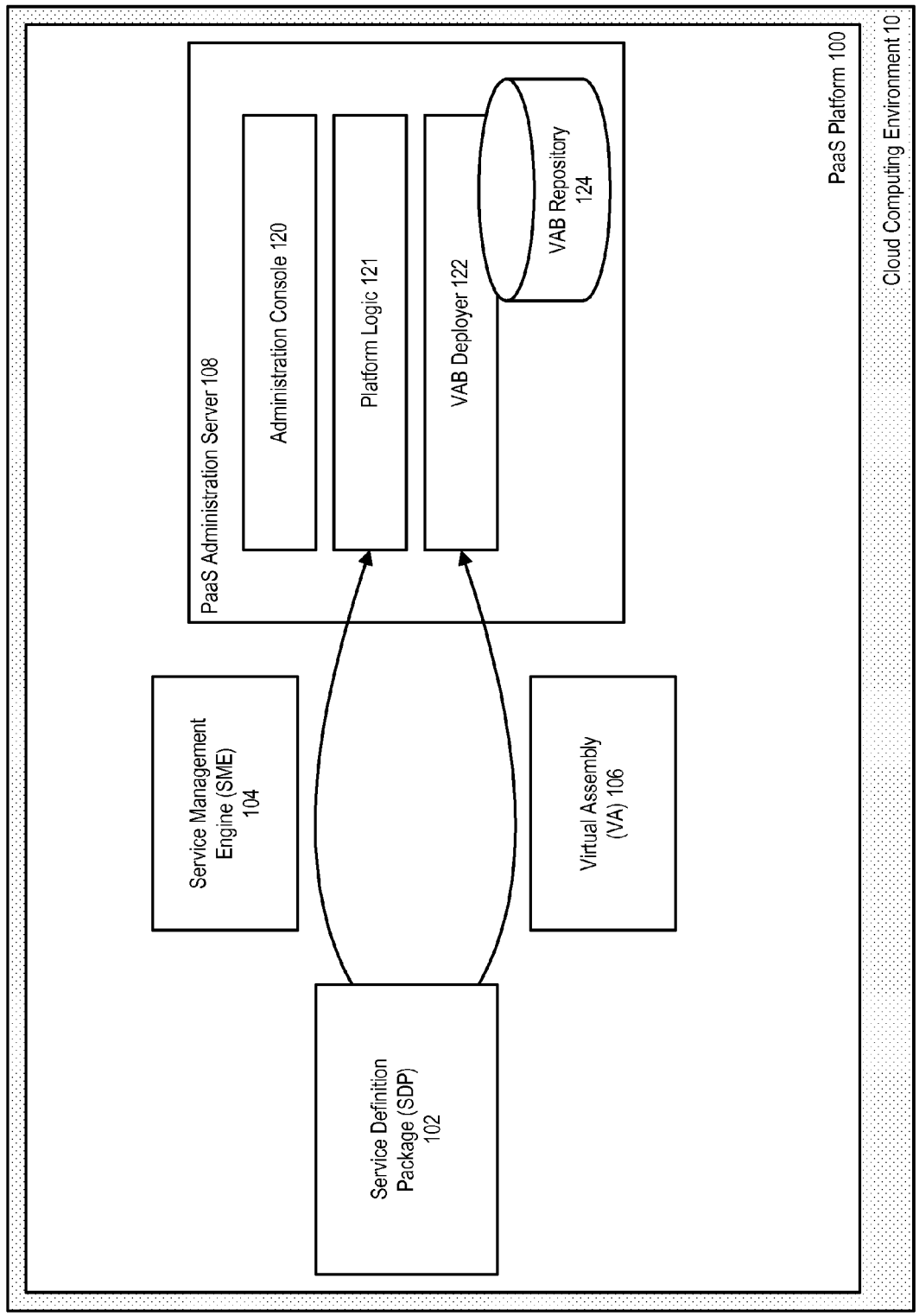
FIG. 3 illustrates the use of service definition packages and service management engines with an administration server, in accordance with an embodiment.

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
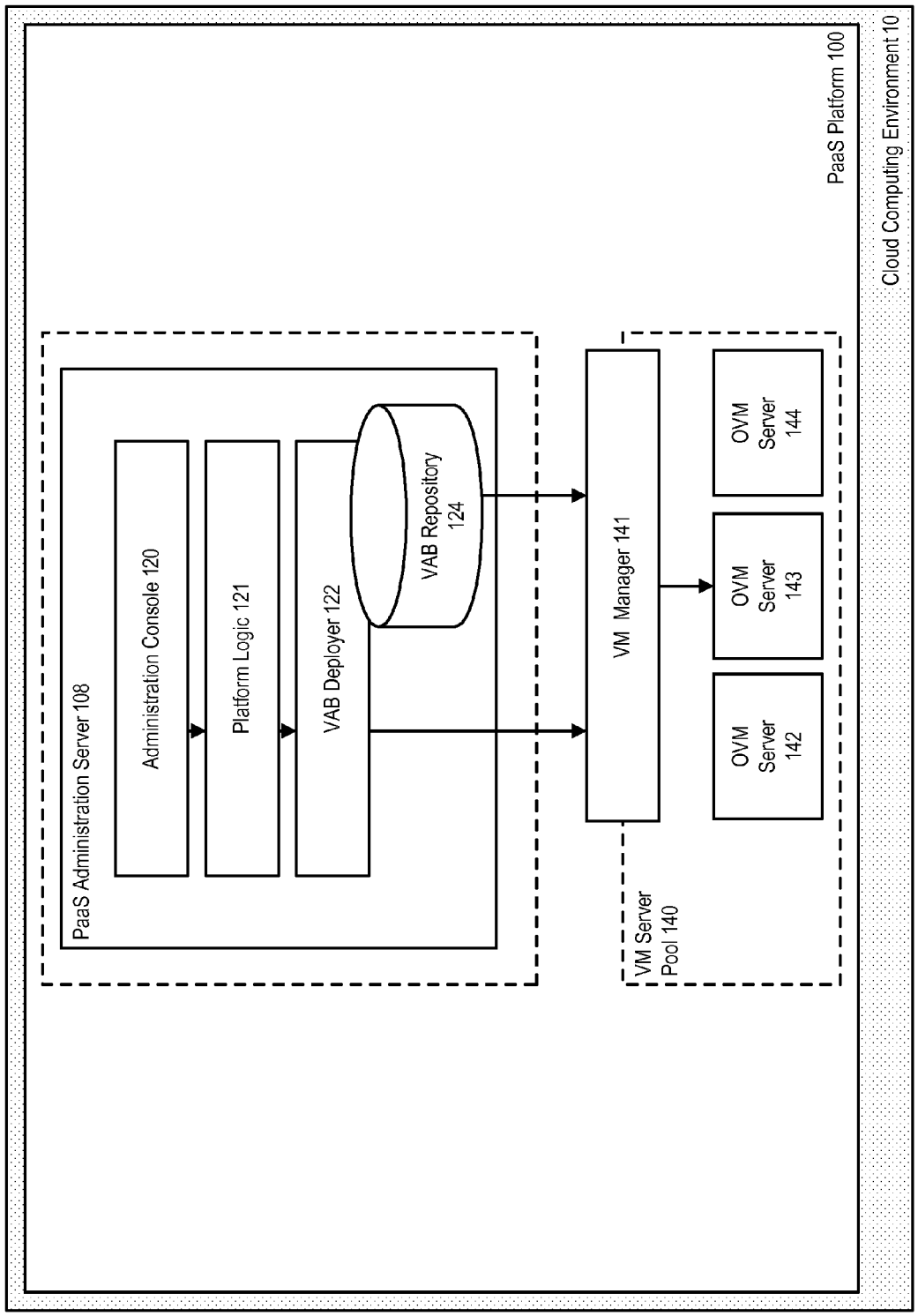
FIG. 4 illustrates the interaction between an administration server and a virtualization manager, in accordance with an embodiment.

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
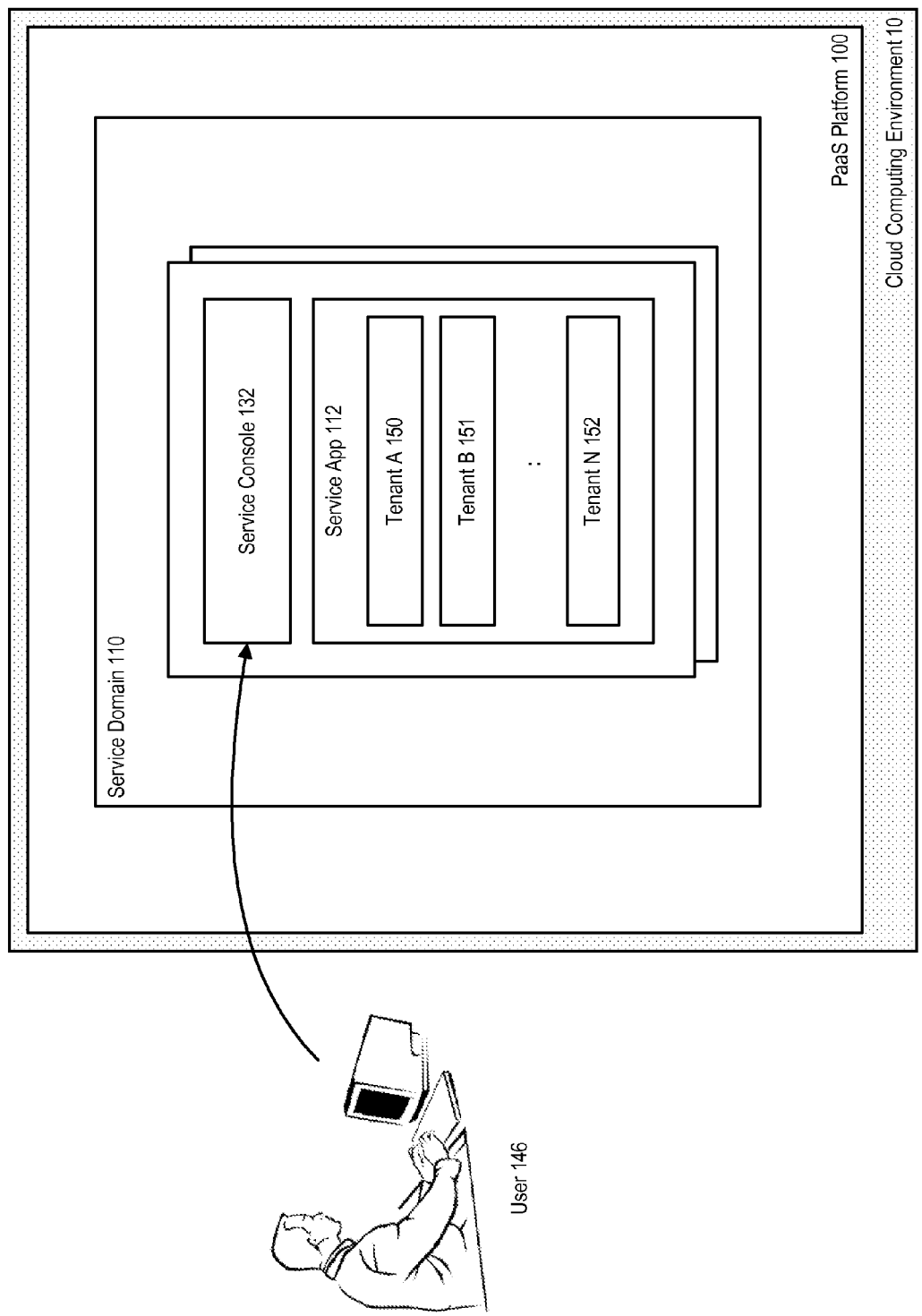
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
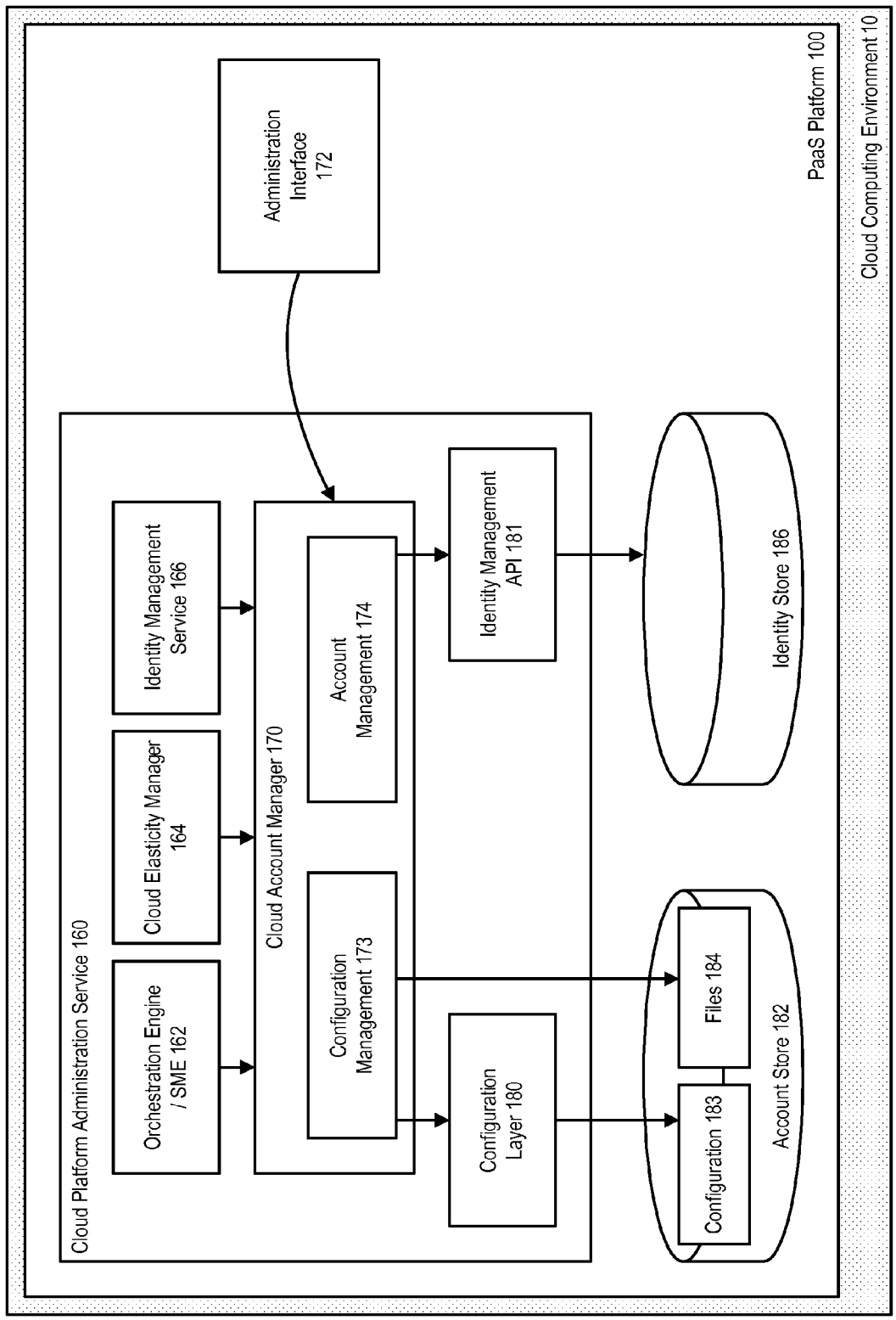
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
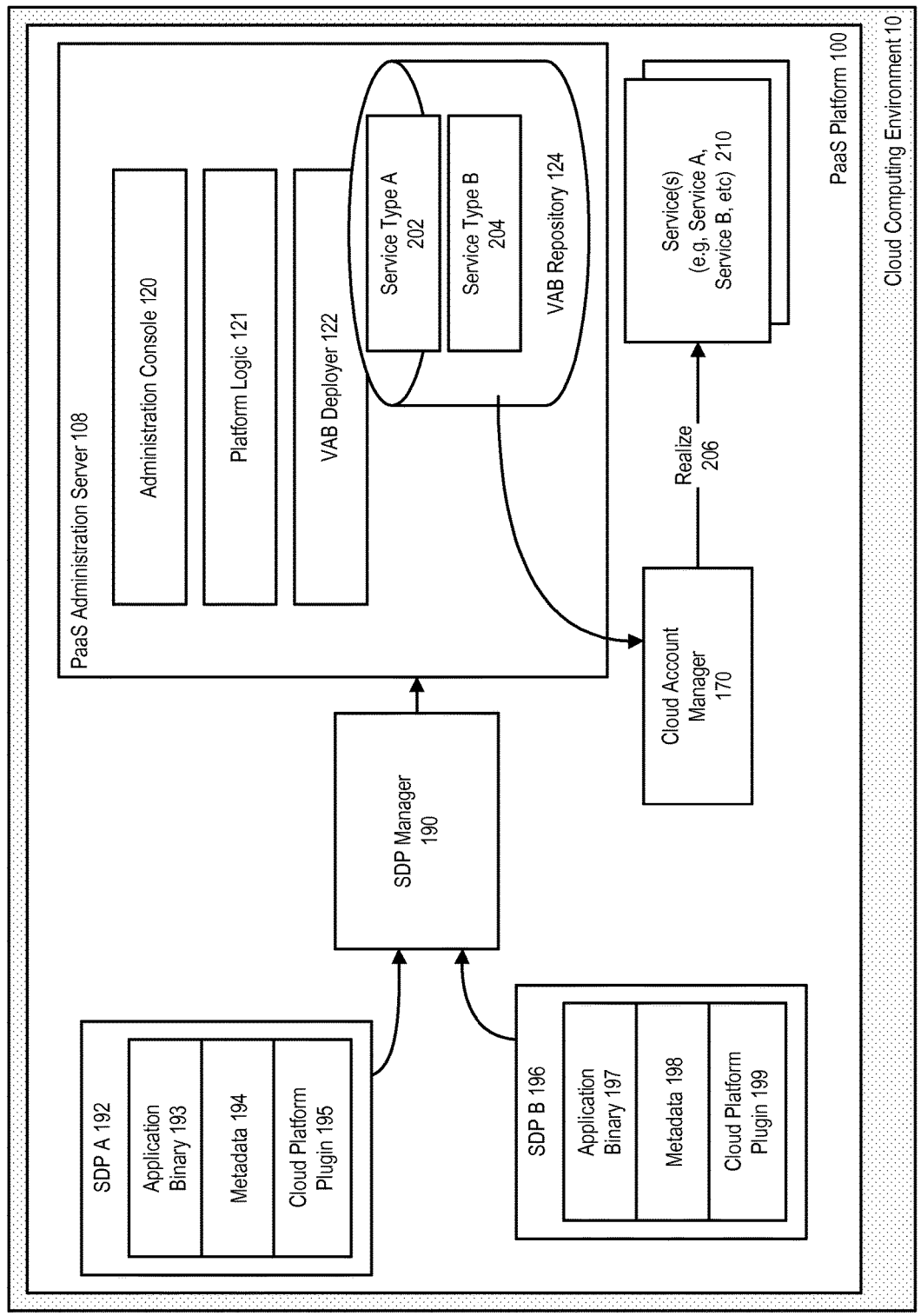
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
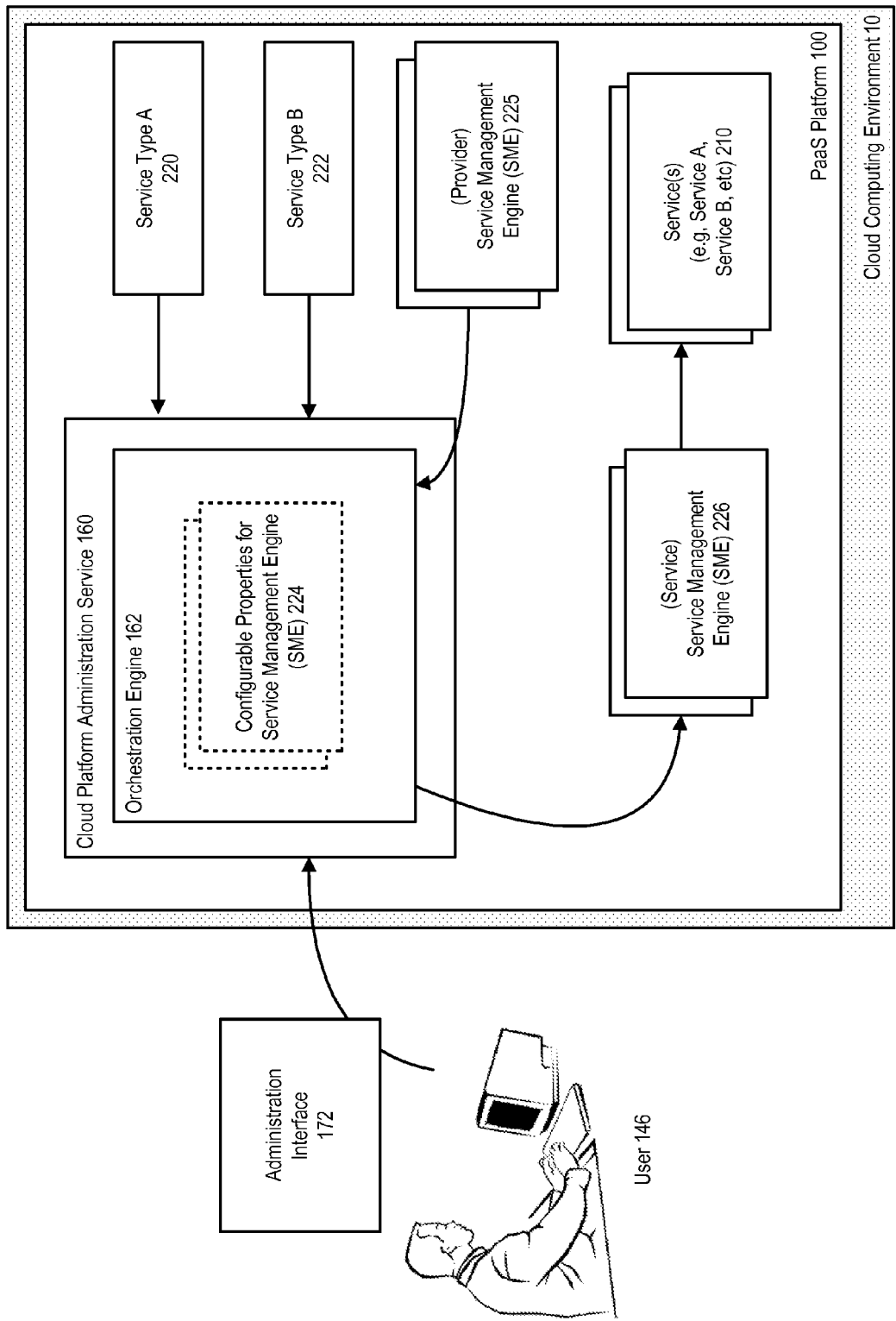
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
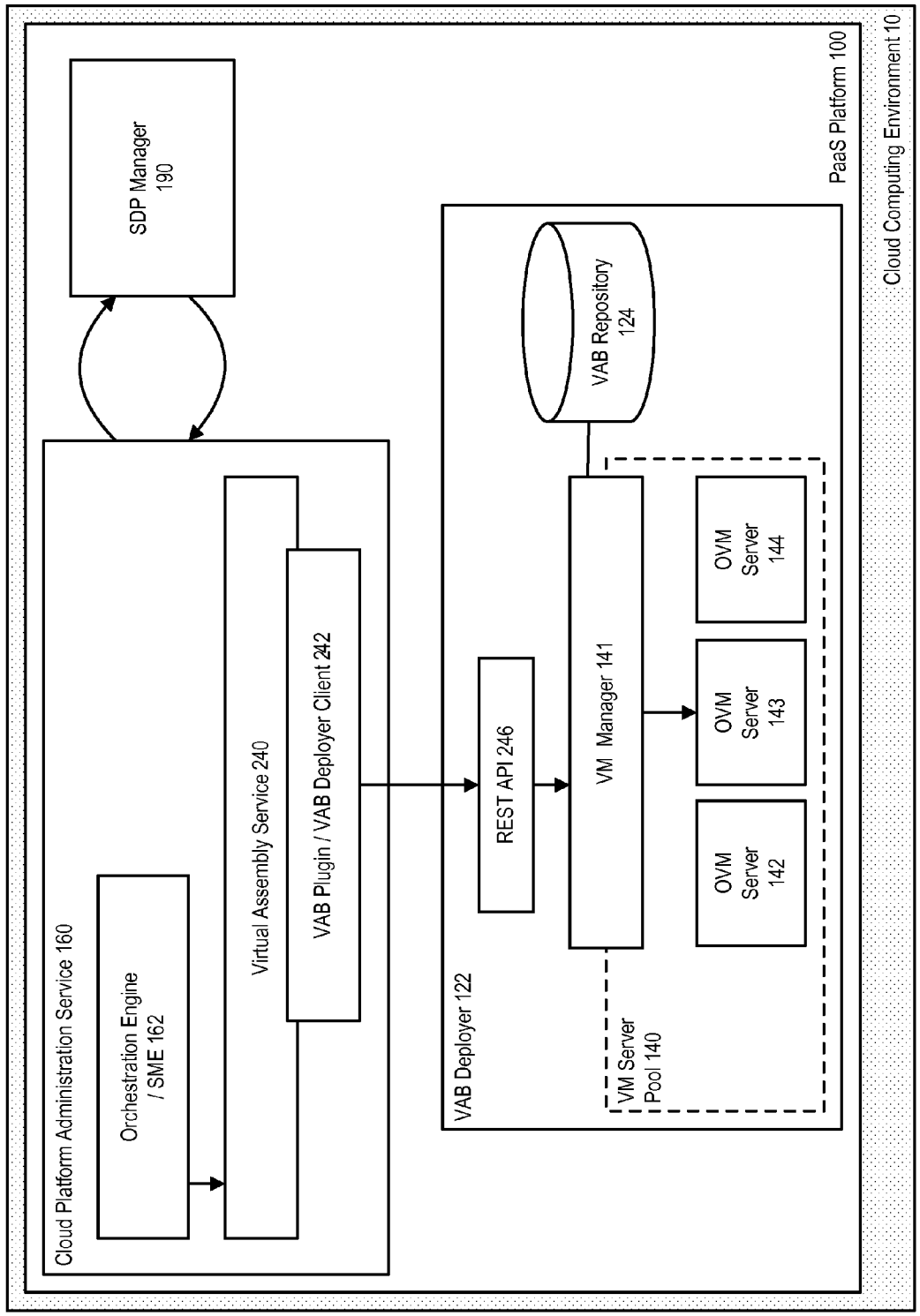
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
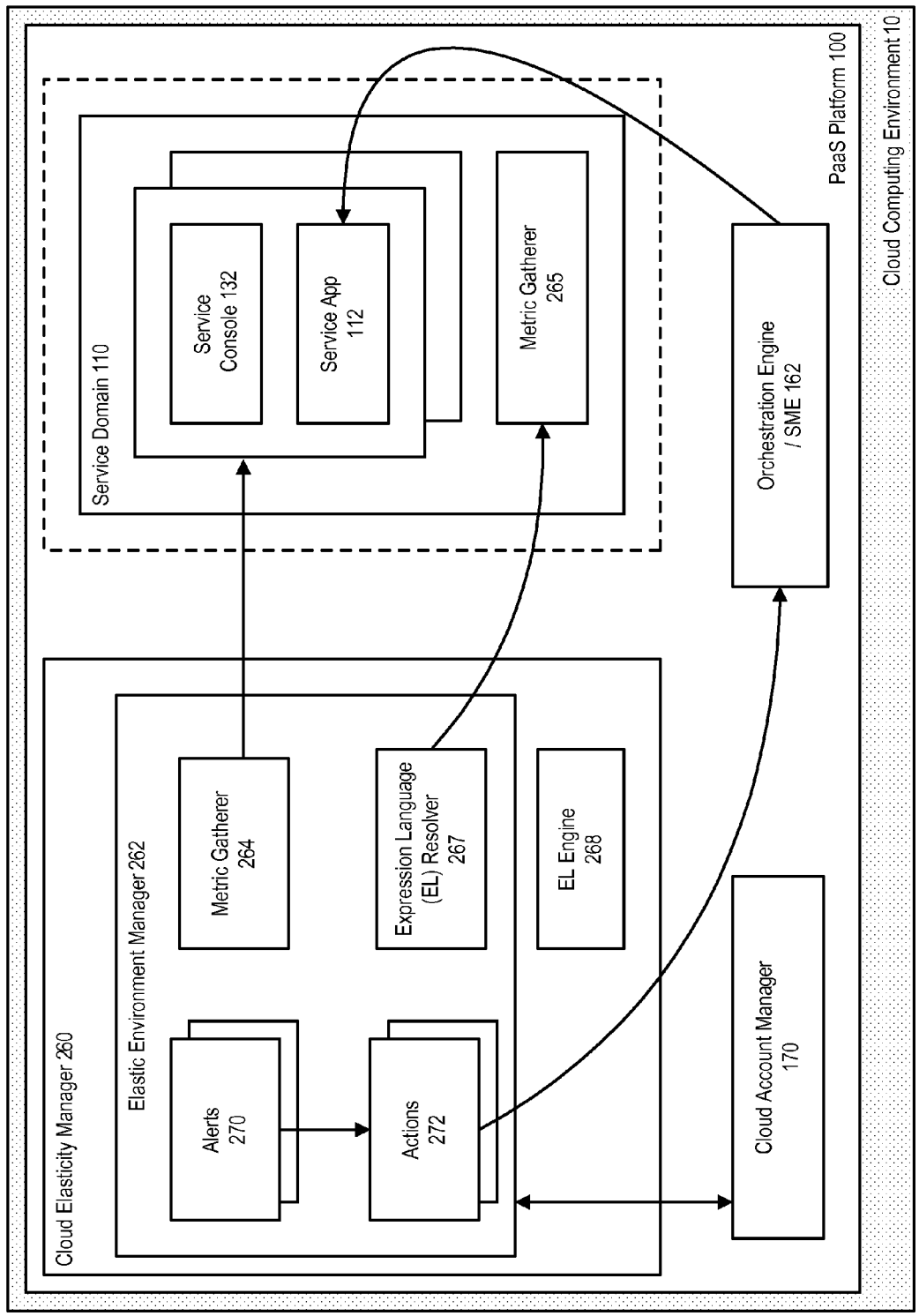
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

* * *

MultiTenancy Support

In accordance with an embodiment, the PaaS platform component or cloud computing environment can enable a service runtime to be shared by multiple tenants, by providing each tenant with a dedicated share or slice of a runtime instance. Each share/slice can be isolated from other shares/slices with respect to factors such as, for example, configuration, or quality of service.

In accordance with an embodiment, during provisioning of a particular service runtime, a runtime definition associated with the service runtime can be utilized, for example by a service management engine, to configure the platform component to install one or more services within the service runtime. A particular service and its service runtimes can also be provisioned, within one or more runtime pools, according to a service runtime definition and placement configuration.

As further described herein, a variety of different approaches can be used to share service runtimes, which can be generally categorized according to the level of runtime sharing provided, for example: one runtime per tenant ("level 1"); a configurable runtime per tenant ("level 2"); a single runtime that serves all tenants ("level 3"); or multiple runtimes with load balancing of tenants among them ("level 4").

Service Runtimes

Figure 11:
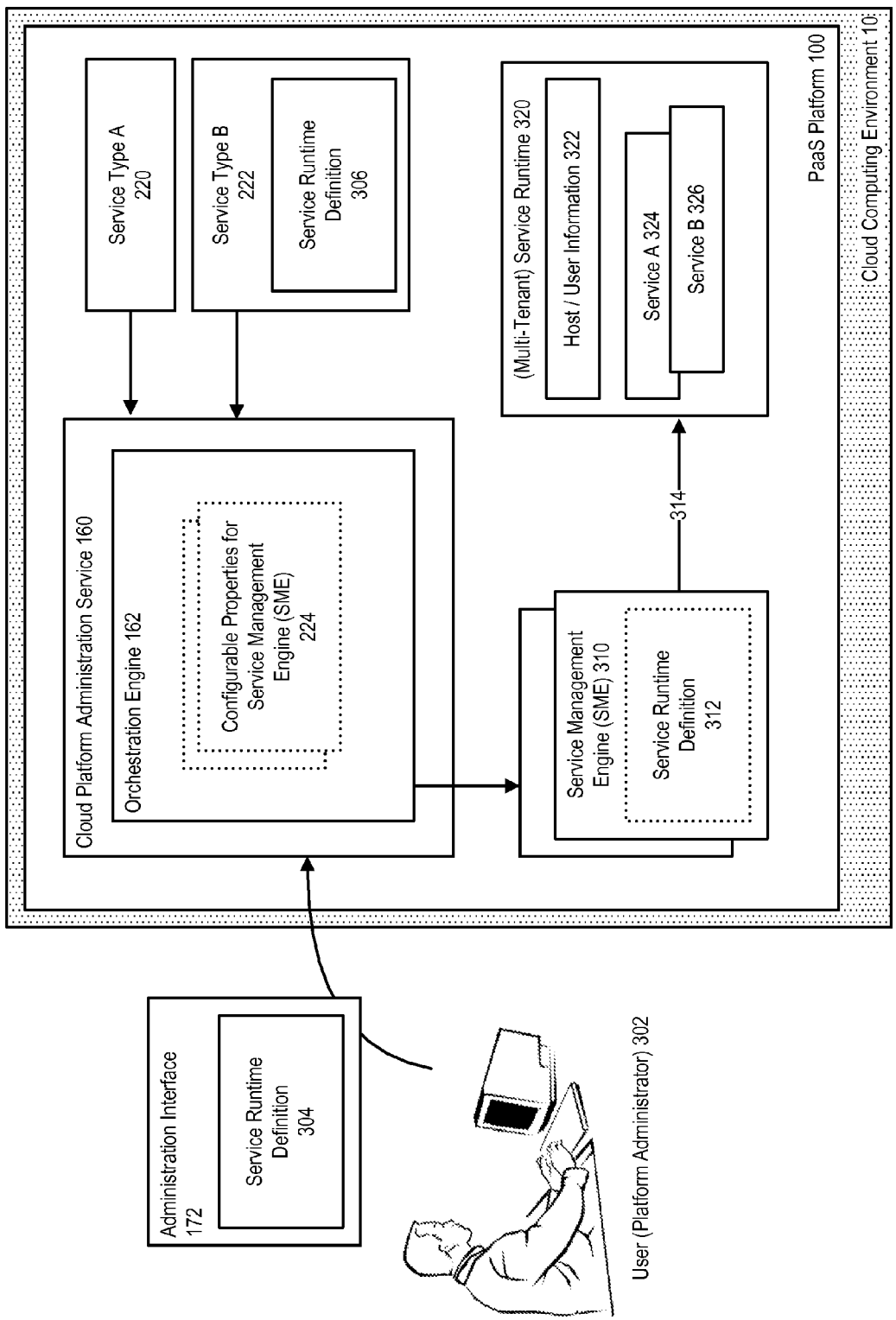
FIG. 11 illustrates support for multitenancy in a PaaS platform or cloud computing environment, in accordance with an embodiment.

FIG. 11 illustrates support for multitenancy in a PaaS platform or cloud computing environment, in accordance with an embodiment.

In accordance with an embodiment, the sharing and isolation characteristics provided by a particular multi-tenant service, and the particular details of how that service will provide isolation between a runtime's shares, can be determined by the service's implementation.

As shown in FIG. 11, in accordance with an embodiment, a user, such as a platform administrator 302, can associate a service runtime definition 304, 306 with one or more services, using an administration interface, a service management engine (SME), and/or an external environment configuration.

During provisioning of a particular service runtime, the runtime definition associated with the service runtime can be utilized by the SME 310, 312, to provision 314 the service runtime 320, which can optionally include a host and/or user information 322, together with one or more services, including in this example service A 324, and service B 326.

In accordance with an embodiment, a service runtime can be provisioned and made available by a variety of means. For example, a platform administrator can manually create a service runtime through the use of a "create-service-runtime" command, an example of which is described below.

Alternatively, a service runtime can be automatically created by an SME—for example, the SME can lazily create a service runtime upon receipt of a first service instance creation request (when a runtime does not already exist), or can create a new service runtime to satisfy quality of service (QoS) guarantees for new/later service instance creation requests.

Alternatively, a service runtime can be externally managed, in which case the service runtime may already exist outside of the cloud environment, so that an administrator can simply provide a pointer to the existing runtime.

Figure 12:
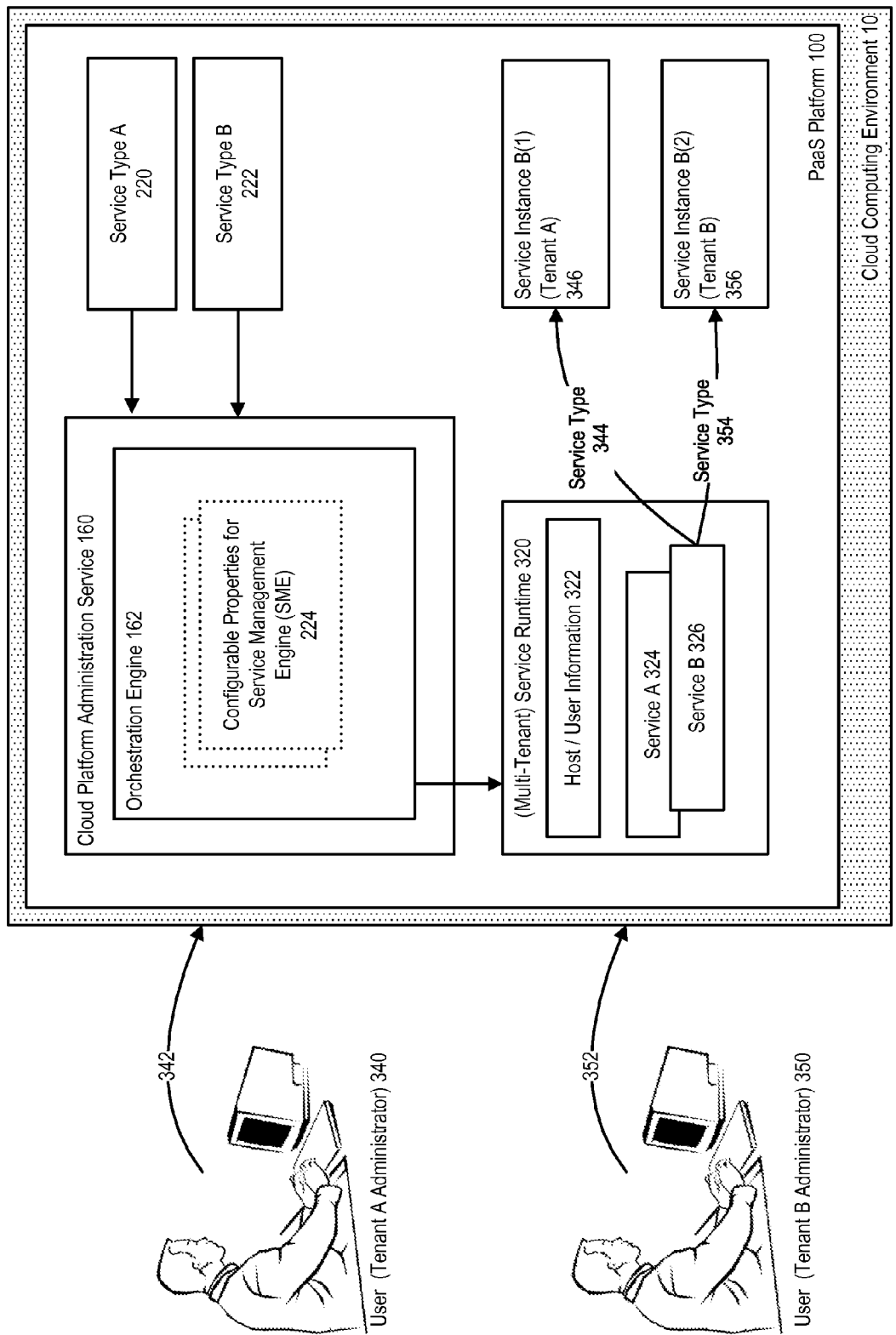
FIG. 12 further illustrates support for multitenancy, in accordance with an embodiment.

FIG. 12 further illustrates support for multitenancy, in accordance with an embodiment.

As shown in FIG. 12, in accordance with an embodiment, each of a plurality of tenant or account administrators, in this example administrator A 340, and administrator B 350, can access the cloud environment 342, 352, and be associated with their own service instance that acts as, or otherwise provides, a share/slice of an available service runtime.

In accordance with an embodiment, a service that is provided within the service runtime—for example service B—can be optionally associated with and exposed for sharing as a service type 344, 354. The service type can then be identified and configured by an administrator to create the separate runtime service instances 346, 356 (i.e., shares/slices of the service runtime), for use by one or multiple tenants—in this example tenants A and B respectively.

By way of example, in the context of an Oracle 12c CDB service runtime, a container database (CDB) runtime may support one or more pluggable database (PDB) services running within the CDB runtime, that can be provided as shares/slices for use by one or multiple tenants.

As another example, in the context of an Oracle WebLogic (WLS) service runtime, a WLS container runtime may support one or more WLS instances as services, that can be similarly provided as shares/slices for use by one or multiple tenants.

In accordance with an embodiment, an administration interface together with administrative commands can be provide to address various scenarios by which an administrator may want to create, start, stop, or otherwise manage a service runtime, some examples of which are illustrated below:

| | |
|---|---|
| $ [padmin\|cadmin] | createserviceruntime sdp soa.sdp properties char1=abc:char2=xyz soart1 |
| $ [padmin\|cadmin] | deleteserviceruntimesoart1 |
| $ [padmin\|cadmin] | startserviceruntimesoart1 |
| $ [padmin\|cadmin] | stopserviceruntimesoart1 |
| $ [padmin\|cadmin] | listserviceruntimes[sdp<nameofsdp>] |

Figure 13:
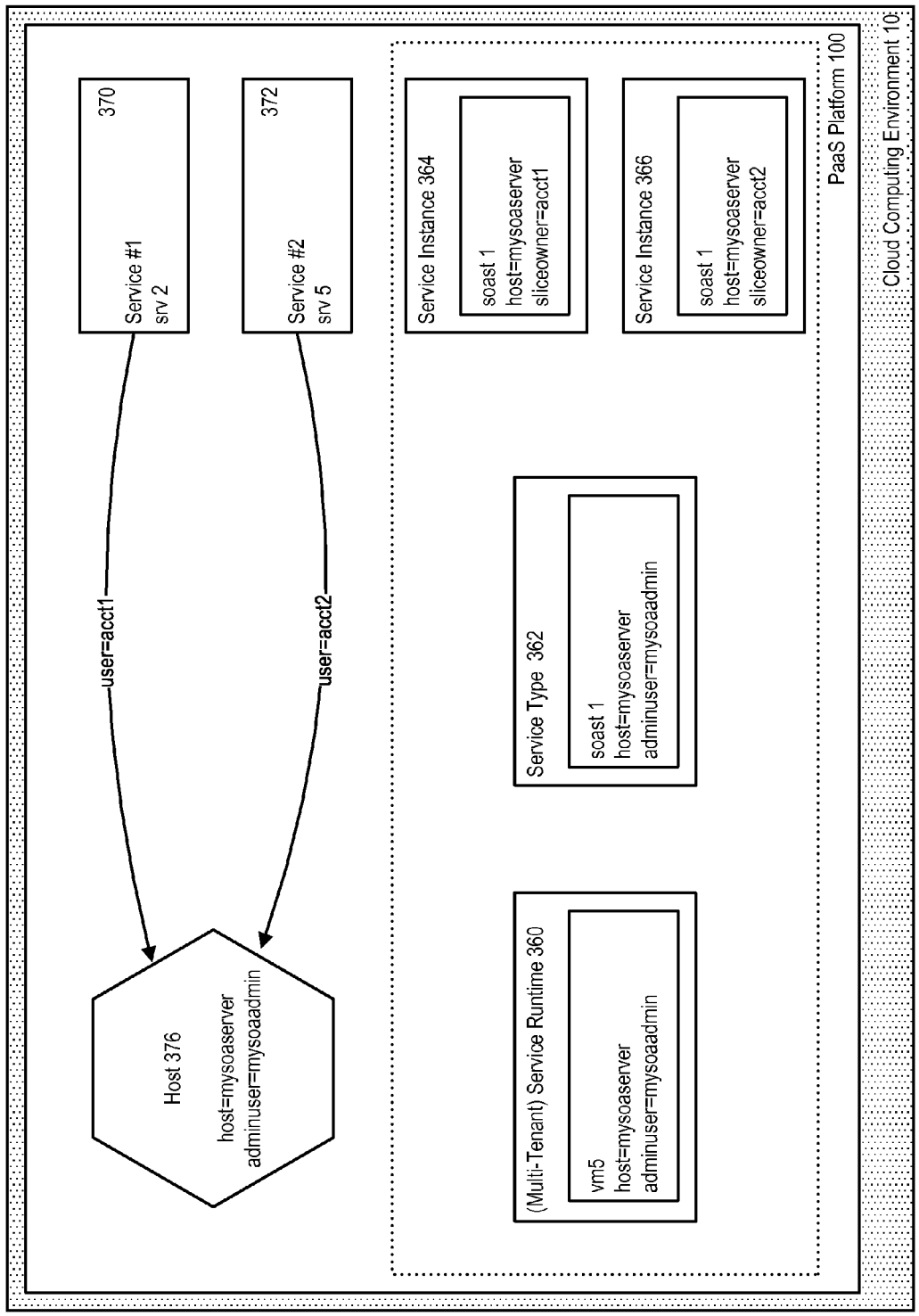
FIG. 13 illustrates an example environment which includes support for multitenancy, in accordance with an embodiment.
Figure 14:
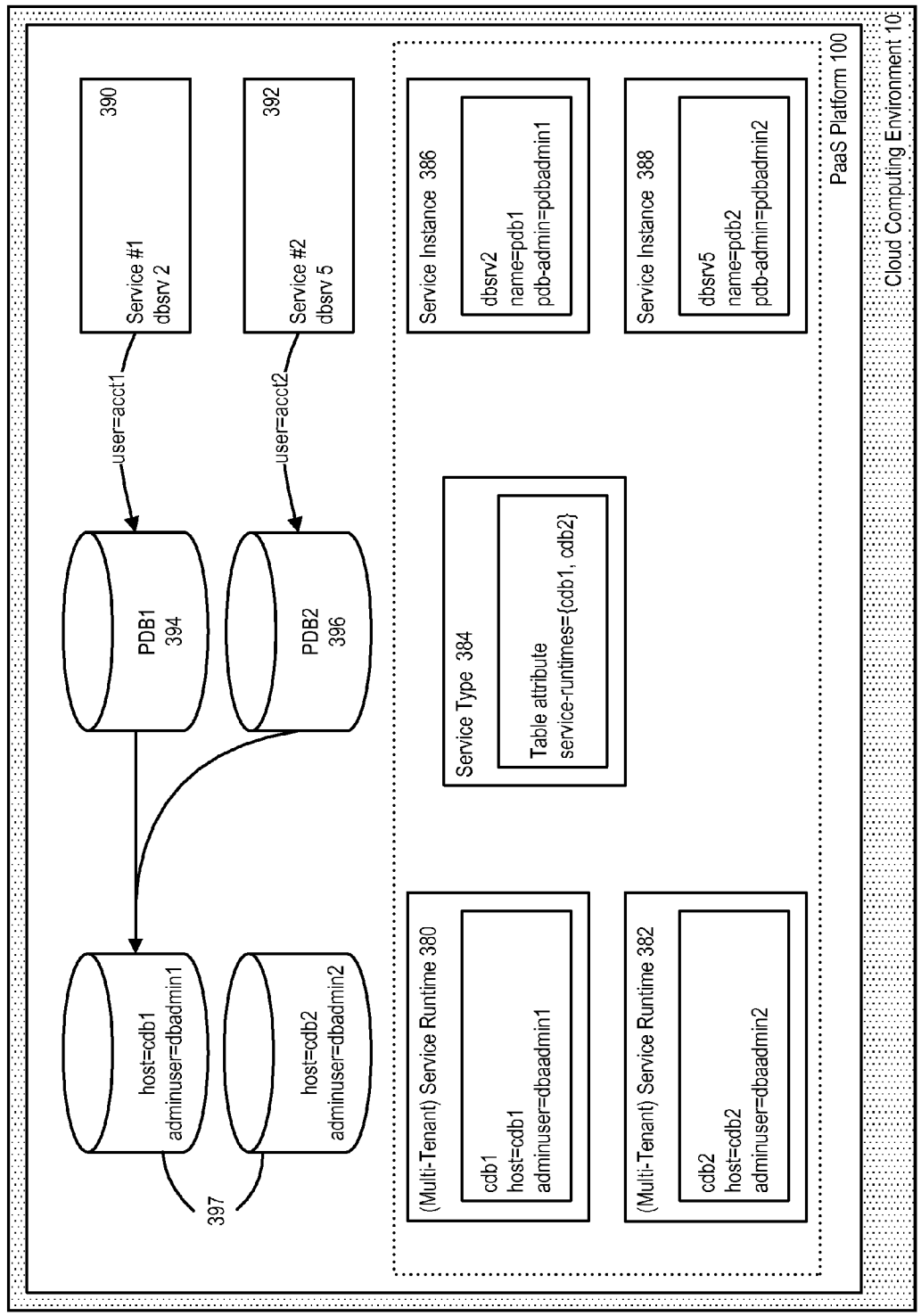
FIG. 14 illustrates another example environment which includes support for multitenancy, in accordance with an embodiment.

FIGS. 13-14 illustrate example environments which include support for multitenancy, in accordance with an embodiment.

In the example illustrated in FIG. 13, a "level 3" (i.e., a single runtime that serves all tenants) service runtime 360 can be exposed as a service type 362, and thereafter provisioned as two or more service instances 364 366—in this case for use with two different tenants or share/slice owners (acct1 and acct2).

When the service instances are provisioned 370, 372, the users acct1 and acct2 can each use their own service instances and its corresponding share/slice of the runtime, to access the runtime host 376.

In the example illustrated in FIG. 14, multiple "level 4" (i.e., multiple runtimes with load balancing of tenants) service runtimes 380, 382 can be exposed as a service type 384, and provisioned as two or more service instances 386, 388, which in this example are associated with different PDBs.

When the service instances are provisioned 390, 392, the users acct1 and acct2 can similarly each use their own service instance and its corresponding share of the runtime(s) to access the PDBs 394, 396, which can then be load-balanced among the actual CDB runtimes 397.

Service Runtime Configuration

In accordance with an embodiment, a service runtime can be associated with a configuration which is different from the service instance's configuration. For example, in the context of a 12c CDB service runtime, a 12c CDB may be configured with admin credentials, the default tablespace, or the default size of datafiles for a PDB.

Service Runtime Dependencies

In accordance with an embodiment, a service runtime can be associated with its own set of dependencies, which may be different from the dependencies of a service instance, and which can be identified and satisfied when creating the runtime.

For example, in the context of a Java service runtime, the runtime may be associated with a storage provider to store the service runtime's (root domain) configuration data (domain.xml), and configuration data corresponding to individual runtime shares/slices; while each of the Java service instances (shares/slices) may be associated with their own database service-resource.

Service Runtime Scaling

In accordance with an embodiment, a service runtime can be scaled if the runtime supports scaling. For example, in the context of a 12c CDB service runtime, scaling of the service runtime may include the provisioning of a new CDB cluster instance, and adding the new cluster instance to the CDB cluster.

Service Runtime Load Balancing

In accordance with an embodiment, for services that support "level 4" multi-tenancy (i.e., multiple runtimes with load balancing of tenants), the SME can dynamically add new or additional service runtimes to satisfy quality of service requirements.

For example, an SME may be associated with a service runtime that has the capability of supporting a maximum of five (5) shares/slices on a shared runtime to satisfy the QoS guarantees of its service instances. In accordance with an embodiment, after five such service instances have been created on the runtime, and a new request for creating a runtime is received, the SME can scale a service runtime in order to provision the service.

In accordance with an embodiment, an SME can automatically load-balance incoming service instance creation requests among a pool of service runtimes, based on factors such as performance, isolation, or the affinity requirements of the incoming request.

Scaling of Services within a Service Runtime

In accordance with an embodiment, if the SME supports scaling of a service based on a multi-tenant runtime, then, while scaling a service instance, the SME can scale or reconfigure the share/slice according to specified scaling attributes. For example, an SME may support scaling of an existing share/slice, or create a new share/slice, to match specified scaling attributes.

Patching of Service Runtimes

In accordance with an embodiment, in a multi-tenant runtime, the patching of a particular runtime can also be used to patch the services associated with that runtime.

Service Configuration

In accordance with an embodiment, in addition to the service runtime configuration, a service may be associated with its own differentiated, e.g., configuration, or QoS.

For example, different tenants may wish to customize their own share/slice of a service runtime without impacting the shares/slices of other tenants. In accordance with an embodiment, the configuration set available to such tenants can be determined by the SME developer based on the isolation provided by the runtime.

For example, in the context of a 12c CDB service runtime, each 12c PDB service instance can have configurable properties such as, for example the admin name, credentials of the PDB, max size of the database, or location of data file, which each tenant can customize for use with their own share/slice, without impacting the shares/slices of other tenants.

Service Dependencies

In accordance with an embodiment, a service may have defined dependencies that must also be satisfied for the service running on a service runtime. For example, a Java service may be defined to have a database dependency, which should be similarly satisfied for that Java service running on a Java service runtime.

Figure 15:
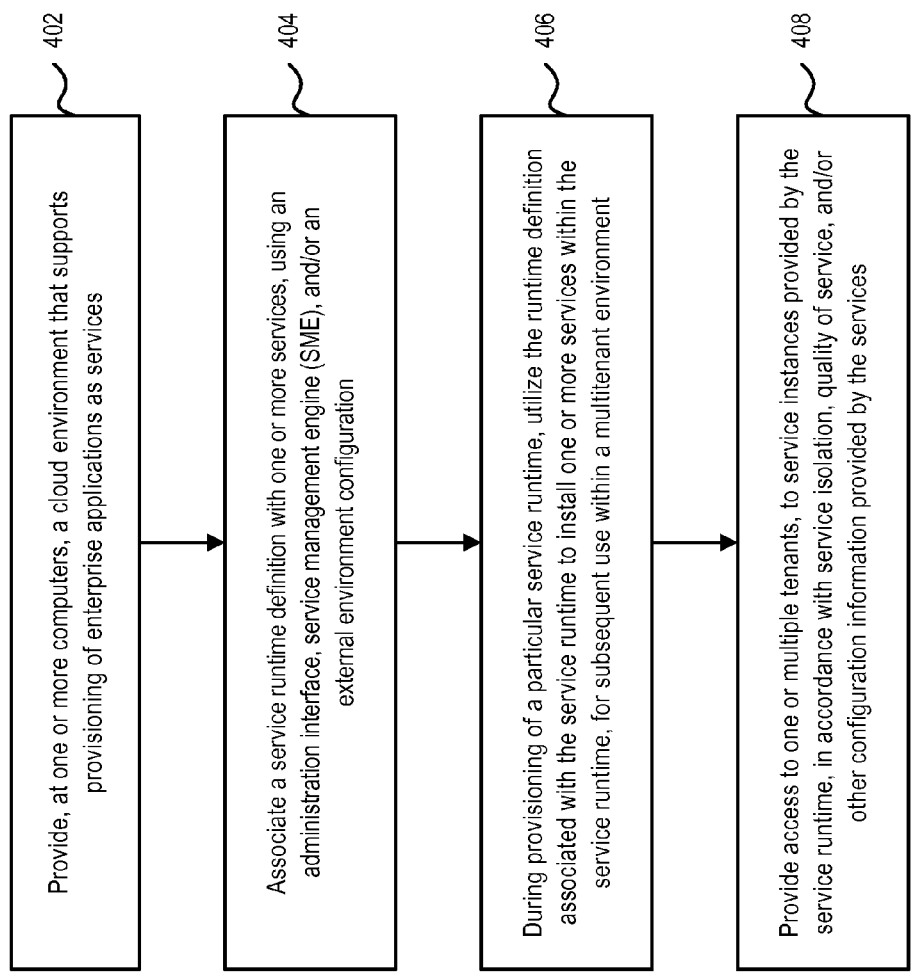
FIG. 15 is a flowchart of a method for supporting multitenancy in a PaaS platform or cloud computing environment, in accordance with an embodiment.

FIG. 15 is a flowchart of a method for supporting multitenancy in a PaaS platform or cloud computing environment, in accordance with an embodiment. As shown in FIG. 15, at step 402, one or more computers are provided with a cloud environment that supports provisioning of enterprise applications as services.

At step 404, a service runtime definition is associated with one or more services, using an administration interface, service management engine (SME), and/or an external environment configuration.

At step 406, during provisioning of a particular service runtime, the runtime definition associated therewith is utilized to install one or more services within the service runtime, for subsequent use within a multitenant environment.

At step 408, access is provided to one or multiple tenants, to service instances provided by the service runtime, in accordance with service isolation, quality of service, and/or other configuration information provided by the services.

* * *

SME Support for Multitenancy

As described above, in accordance with an embodiment, the system can include use of a service management engine to support multitenancy in a PaaS platform or cloud computing environment. At a high level, the relationship between service type, service runtime and service can be represented as:

(service type)-1--*->(service)<-*---*-(service runtime).

In accordance with an embodiment, the creation of the service runtime is determined by the internal implementation of the service management engine (SME).

For example, in accordance with an embodiment, based on its configuration, the SME can determine to create a service that has one runtime, many runtimes, or zero runtimes. Generally, a platform administrator is aware of the service types available, while the tenant administrator is aware of the services available, and can configure these as appropriate; however, the implementation by which the SME creates the service and/or service runtime is determined by the SME.

Figure 16:
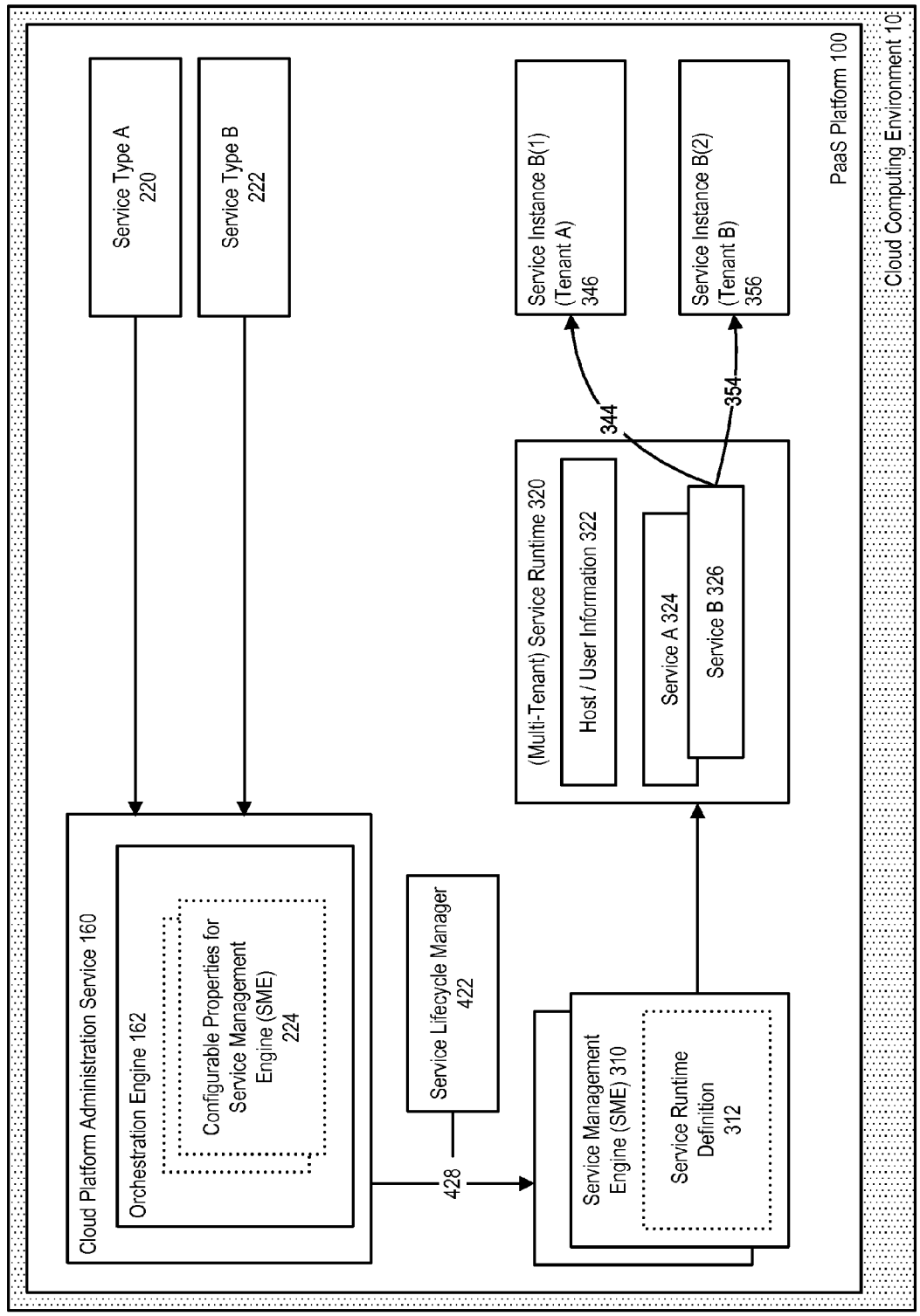
FIG. 16 illustrates the use of a service management engine to support multitenancy in a PaaS platform or cloud computing environment, in accordance with an embodiment.

FIG. 16 illustrates the use of a service management engine to support multitenancy in a PaaS platform or cloud computing environment, in accordance with an embodiment. As shown in FIG. 16, in accordance with an embodiment, a service lifecycle manager 422 (ServiceLifeCycleManager) enables configuration information to be provided during provisioning 428 of a service by an SME.

In accordance with an embodiment, a runtime manager (ServiceRuntimeManager) interface can be provided by the service lifecycle manager, and can include callable methods that allow configuration of a service runtime definition, for example:

```
configureType(RuntimeServiceDefinition typeDefn);
reconfigureType(RuntimeServiceDefinition oldTypeDefn,
RuntimeServiceDefinition newTypeDefn,
Collection<Service> existingServices);
```

In accordance with an embodiment, during type creation, the orchestration engine can invoke a configuration validator (ServiceConfigValidator), in order to validate any supplied parameters. If the validation is successful, then a configure type method of the runtime manager interface (ServiceLifeCycleManager.configureType) can be invoked, to provide an opportunity for the SME to perform any necessary initializations.

For example, in the context of a 12c CDB service runtime as described above, a database provider may be required to initialize the CDB.

In accordance with an embodiment, when the SME performs any necessary initializations, it can update the parameters in its type definition (typeDefn). The orchestration engine can then persist the type configuration, for subsequent use by one or multiple tenants in creating shares/slices of the service runtime.

In accordance with an embodiment, a multi-tenant service can also be provided as an extension to an existing service interface, for example:

```
interface MultiTenantService extends Service {
    Collection<Runtime> getRuntimes( );
}
```

Figure 17:
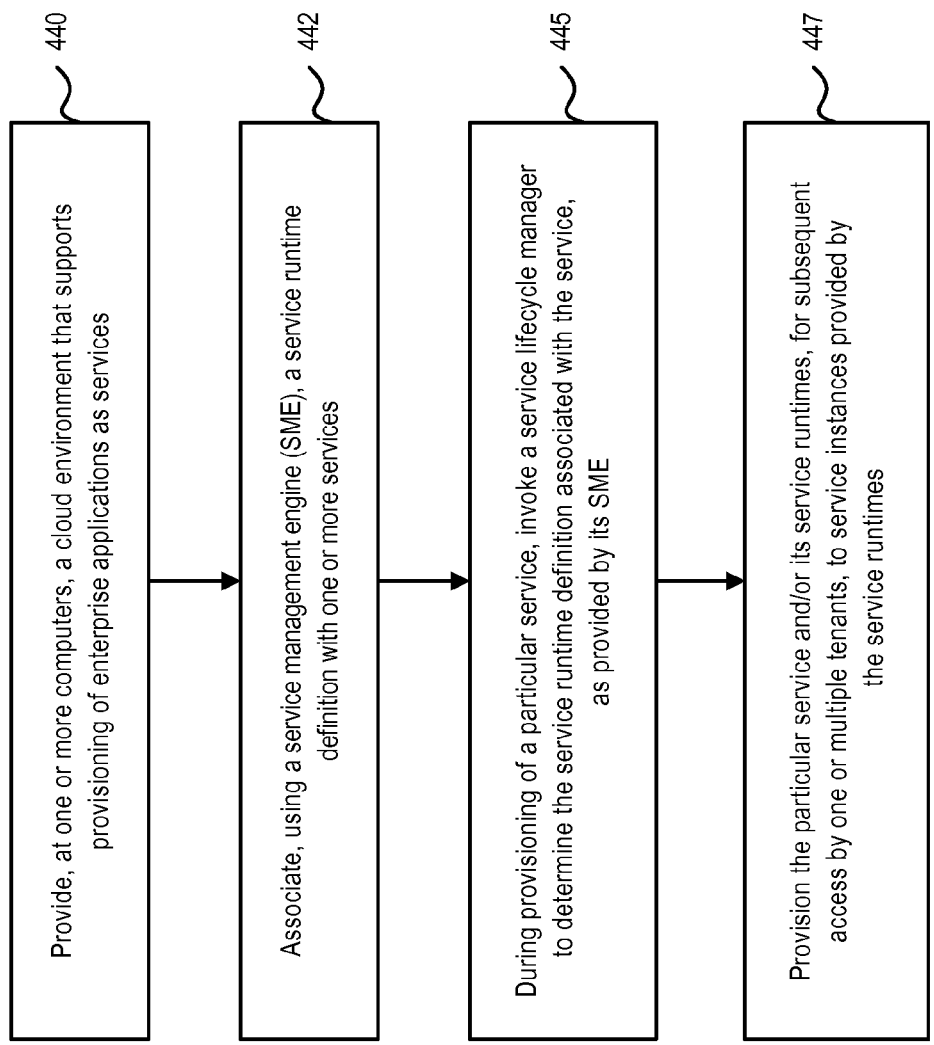
FIG. 17 is a flowchart of a method for using a service management engine to support multitenancy in a PaaS platform or cloud computing environment, in accordance with an embodiment.

FIG. 17 is a flowchart of a method for using a service management engine to support multitenancy in a PaaS platform or cloud computing environment, in accordance with an embodiment. As shown in FIG. 17, in accordance with an embodiment, at step 440, one or more computers are provided with a cloud environment that supports provisioning of enterprise applications as services.

At step 442, using a service management engine (SME), a service runtime definition is associated with one or more services.

At step 445, during provisioning of a particular service, a service lifecycle manager is invoked to determine the service runtime definition associated with the service, as provided by its SME.

At step 447, the particular service and/or its service runtimes are provisioned, for subsequent access by one or multiple tenants, to service instances provided by the service runtimes.

* * *

MultiTenant Placement Logic

In accordance with an embodiment, the system can include use of a placement logic to support multitenancy in a PaaS platform or cloud computing environment.

In accordance with an embodiment, when a pool of service runtimes are configured as part of a service/provider type, the corresponding service management engine (SME) can include a placement logic, which it uses to select a runtime from a configured pool when a request to create a service/provider instance is received.

Service runtimes which are configured as part of a service/provider type may be heterogeneous. For example, they may be in different geographic location, or may have different hardware capabilities. In accordance with an embodiment, the placement logic can take such characteristics into consideration when selecting a particular runtime.

In accordance with an embodiment, the selection of a particular runtime can also respect the available capacity of a runtime, in addition to any, e.g., quota restrictions of the requesting tenant or account.

In accordance with an embodiment, the use of placement logic can be applied to single-tenancy scenarios, in addition to multi-tenancy scenarios, for example to address resource pooling use cases. In such scenarios, a single tenancy can be treated as a special case of multi-tenancy, wherein the capacity of each runtime is one (1).

Figure 18:
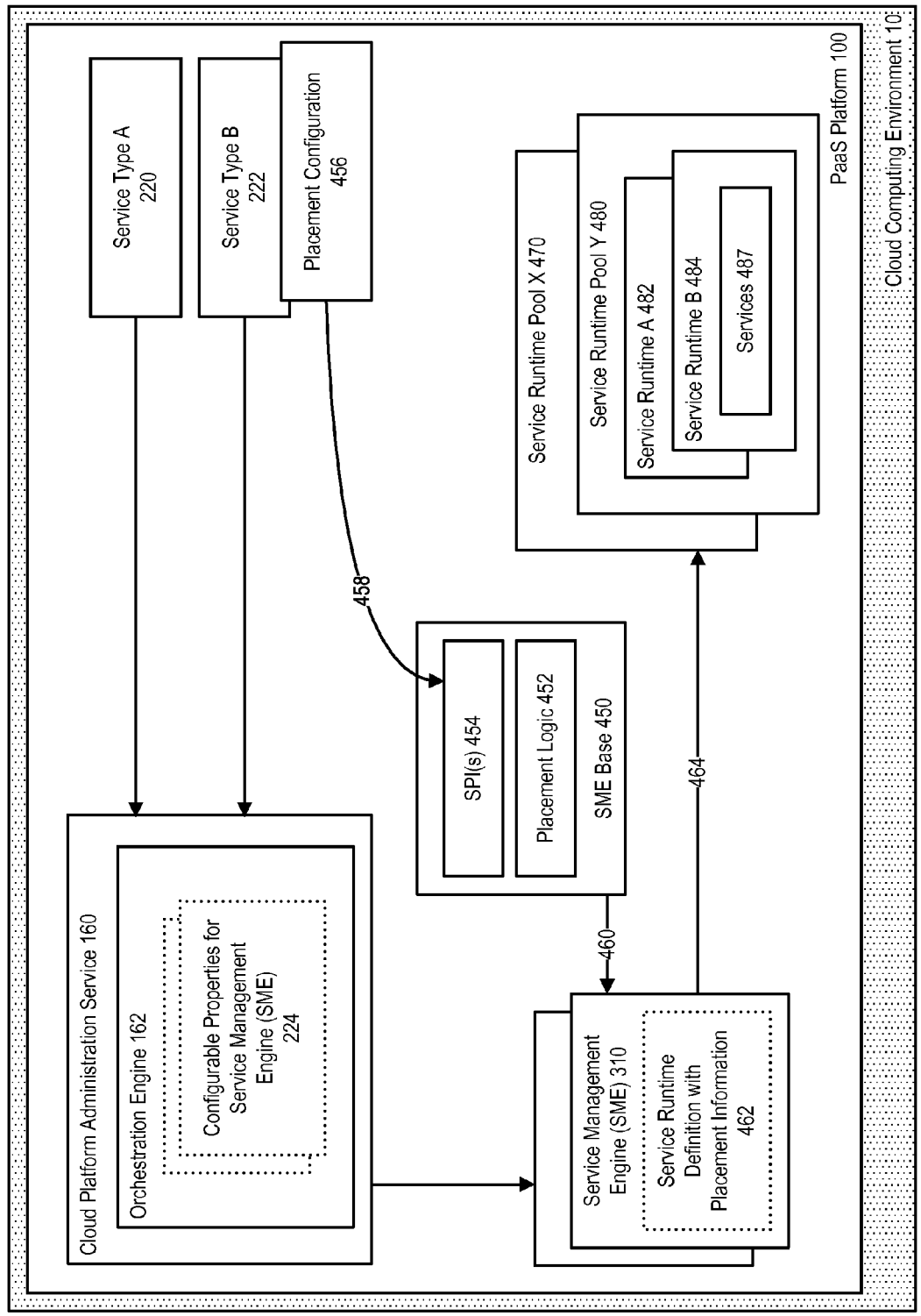
FIG. 18 illustrates the use of a placement logic to support multitenancy in a PaaS platform or cloud computing environment, in accordance with an embodiment.

FIG. 18 illustrates the use of a placement logic to support multitenancy in a PaaS platform or cloud computing environment, in accordance with an embodiment.

As shown in FIG. 18, in accordance with an embodiment, an SME, either as part of its SME base configuration 450 or otherwise, can provide a means of defining a placement logic 452, for example through the use of a service provider interface (SPI) 454.

In accordance with an embodiment, a placement configuration 456 which is associated with a service, can be provided 458 and used to configure 460 the SME with service runtime placement information 462. The service runtime placement information can then be used 464 by the SME, to determine which of one or more service runtime pools X 470, Y 480, or service runtimes A 482, B 484, should be used when provisioning instances of the services 487.

Specification of Multiple Runtimes

In accordance with an embodiment, a service definition (e.g., as defined by an xml configuration file) can be adapted to accept multiple runtimes as input. For example, in the context of an Oracle 12c CDB service runtime as described above, a sample service definition using a table property can be provided as:

```
<servicedefinition name="OracleVirtualizedDatabase" vendor="Oracle" version="1.0">
<tenancy model="ANY"/>
<characteristics>
<family>Database</family>
<vendor>Oracle</vendor>
<version>12.1.1.*</version>
</characteristics>
<servicemanagementengine
id="com.oracle.cloudlogic.sme.oracle.database.virtualized">
<file>
<location>paas.oracledbprovider.jar</location>
</file>
</servicemanagementengine>
<properties>
<tableproperty name="dbhostspool" description="individual host details">
<entry>
<property name="dbhost" datatype=" STRING"/>
<property name="dbport" datatype=" INTEGER"/>
<property name="dbuser" datatype=" STRING"/>
<property name="dbpassword" datatype=" STRING"/>
<property name="dbname" datatype=" STRING"/>
<property name="dbrole" datatype=" STRING"/>
<property name="dbcapacity" datatype=" INTEGER"/>
<property name="dbattributes" datatype=" String"/>
</entry>
</tableproperty>
</properties>
</servicedefinition>
```

In accordance with an embodiment, an example command to create a service resource type can be provided as:

padmin createprovidertype user admin password admin123 sdp

In accordance with an embodiment, to support multiple service runtimes, the service definition should provide the ability for an SME to define runtime configurable properties and dependencies; and to create, register and use runtimes while creating service/provider types.

Pluggable Placement Logic SPI

In accordance with an embodiment, a generic implementation for SME interfaces can be provided in the SME's SME base configuration, which the SME can override by providing service-specific information, including placement logic where appropriate.

For example, in accordance with an embodiment, a service provider interface (SPI) can be exposed as part of an sme-apis module, which can be implemented by a service to plug in custom placement logic. In accordance with an embodiment, a basic implementation can be provided by the SME base itself, including the capability to, e.g., distribute requests for service/provider instances across available runtimes in a round-robin fashion.

Figure 19:
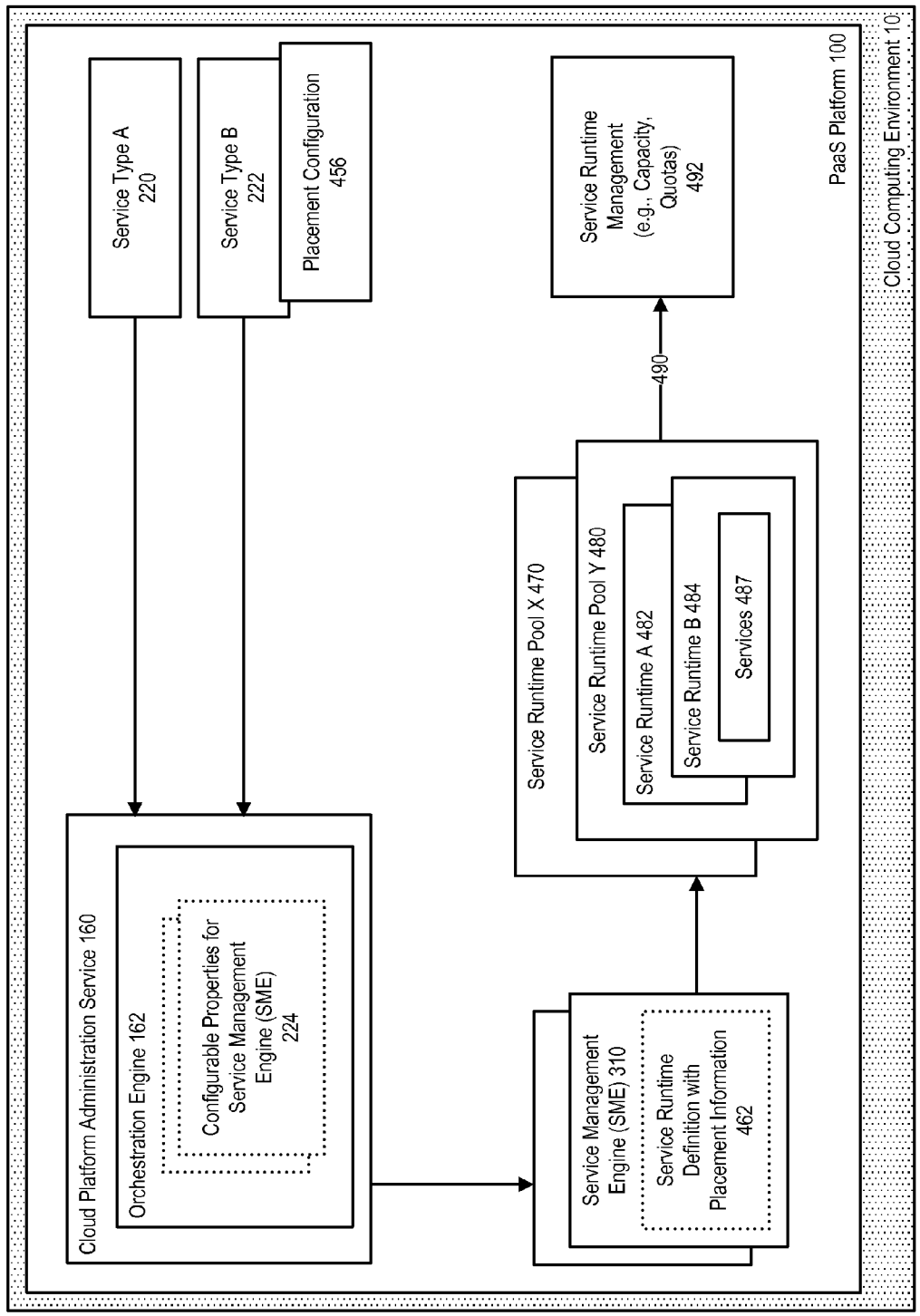
FIG. 19 further illustrates the use of a placement logic to support multitenancy, in accordance with an embodiment.

FIG. 19 further illustrates the use of a placement logic to support multitenancy, in accordance with an embodiment. As described above, the selection of a particular runtime can respect the available capacity of a runtime, in addition to any quota restrictions of the requesting tenant or account.

As shown in FIG. 19, in accordance with an embodiment, information about provisioned services can be provided 490 to a service runtime management component 492 including, for example, information such as the available capacity of a service runtime or runtime pool.

Figure 20:
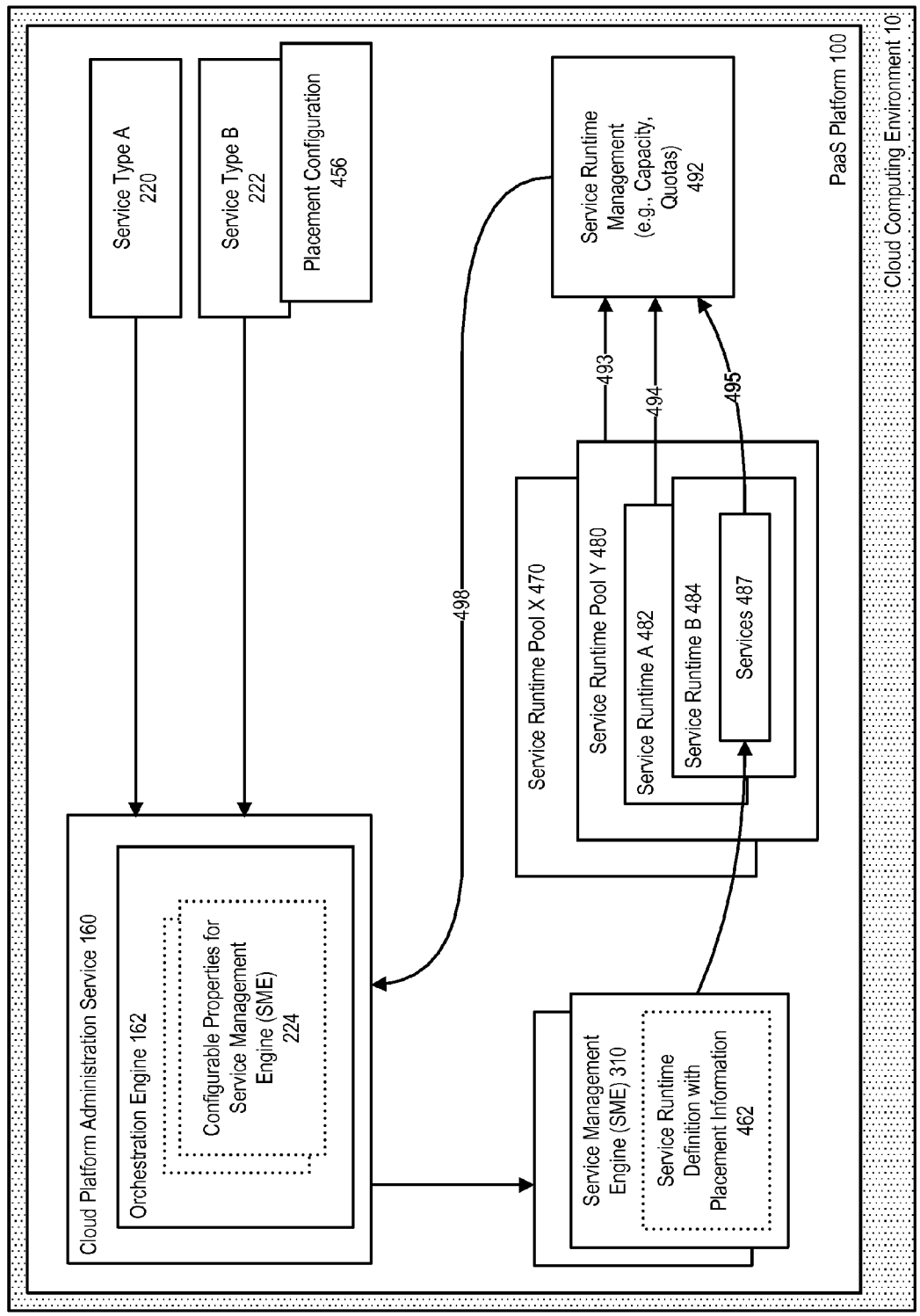
FIG. 20 further illustrates the use of a placement logic to support multitenancy, in accordance with an embodiment.

FIG. 20 further illustrates the use of a placement logic to support multitenancy, in accordance with an embodiment.

As shown in FIG. 20, in accordance with an embodiment, information about provisioned services, including its service runtime or runtime pool, can be provided 493, 494, 495, to the service runtime management component, and thereafter 498 to, e.g., the orchestration engine, or can be otherwise used in determining a runtime placement that respects factors such as the capacity of the runtime, or restrictions of the tenant.

Capacity Planning

In accordance with an embodiment, a service runtime may have a configurable capacity, which depends, for example, on the hardware capabilities associated with the runtime, or how many instances of service/provider it can hold. This capacity can be considered in creating a service/provider instance. For example, the capacity for each runtime can be accepted via a propriety configurable property (db-capacity), which the SME can parse and use to set ServiceRuntime instance, such that a method getMaxCapacity( )returns this value appropriately.

Quota Management

In accordance with an embodiment, each tenant or account may have quota or other restrictions with respect to how many service/provider instances they can create. Such quota restrictions can be taken into account when creating service/provider instances. For example, the quota restrictions can be applied at a layer above SME, e.g., at the orchestration engine level; and/or alternatively can be managed by the SME base, in which case the system can use the above techniques to check whether a particular tenant or account has sufficient quota to create the requested service/provider instances.

Service and Service Type Tagging

In accordance with an embodiment, tagging can be used to tag elements such as service/provider types, runtimes, and virtualization configurations, and can also be used in conjunction with placement logic.

For example, while creating a service-type or service, a user can specify tags, which can be later used for selecting/provisioning a runtime. For example, if a runtime is tagged with a geographic location, when a service is created it can also have a tag specifying the geographic location (e.g., EUROPE), which tags will then be used to select a runtime in the appropriate geographic region.

In accordance with an embodiment, tags can be used to support selection and provisioning use cases. For example, in a selection use case that can be used with providers, when a service-type/service is created, a set of tags can be provided. When resolving the dependencies of a service, calls can be received at a provider SME to select a runtime from a set of configured runtimes. The SME can select a runtime by matching tags specified for a runtime, with tags specified for a service.

In accordance with an embodiment, in a provisioning use case that can be used with services, when a service-type/service is created, a set of tags can be provided. When a runtime is to be created, the runtime creation can be based on specified tags. For example, a tag specified for a service may imply a geographic location of EUROPE. In such example, a configuration pointing to a virtualized (e.g., OVM) pool in EUROPE can be selected and used to provision the runtime.

SDP Format

In accordance with an embodiment, a service runtime can be defined by a service definition schema, or SDP.

SDP Manager

In accordance with an embodiment, the SDP manager can be adapted to accept multiple runtimes based on a runtime definition in the service definition schema, and to allow tags to be specified for, e.g., service/provider type, runtimes.

SME API

In accordance with an embodiment, an SPI can be defined as described above, to allow plugin of placement logic, or to check capacity of a runtime.

SME Base

In accordance with an embodiment, the SME base can provide an implementation as described above for placement logic based on, e.g., round-robin algorithm; or to validate that a runtime has the capacity to create new service/provider instance; validate that an account has sufficient quota to create new service/provider instance; or provide a generic implementation to select a runtime by matching tags.

Illustrative Example

In accordance with an embodiment, a service definition (e.g., as defined by an xml configuration file) can be provided to capture configurable properties for a service runtime, as illustrated below in the context of an Oracle 12c CDB service runtime:

```
<servicedefinition
xmlns="http://www.oracle.com/ns/cloudlogic/servicedefinition_1_0"
xmlns:xsi="http://www.w3.org/2001/XMLSchemainstance"
xsi:schemaLocation="http://www.oracle.com/ns/cloudlogic/
servicedefinition_1_0
http://www.oracle.com/ns/cloudlogic/servicedefinition_1_0/
servicedefinition.xsd"
name="OracleDatabase" vendor="Oracle" version="1.0">
    <tenancy model="ANY"/>
        <characteristics>
        <family>Database</family>
        <characteristic name="Vendor" value="Oracle"/>
        <characteristic name="product" value="Database"/>
        </characteristics>
<featuresets>
    <featureset name="ORACLEDB"
    description="This featureset covers all legacy Oracle Database scenario"
        default="true">
        <propertysetref name="common"/>
        <propertysetref name="hostport"/>
        </featureset>
<featuresetname="ORACLERACDB"description="This featuresetcovers multinodeOracle RAC Database scenario">
        <propertysetref name="common"/>
        <propertysetref name="racnodes"/>
        </featureset>
<featureset name="ORACLE12cDB" description= "This featureset covers Oracle 12c Database(CDB) which can be used to create virtualized database, i.e. PDB">
        <propertysetref name="common"/>
        <propertysetref name="hostport"/>
        </featureset>
        </featuresets>
<properties>
    <propertyset name="hostport" type="runtime">
        <property name="dbhost" datatype="STRING"/>
        <property name="dbport" datatype=" INTEGER"/>
        </propertyset>
<propertyset name="common" type="runtime"> <property name="dbname" datatype=" STRING"/>
        <property name="dbuser" datatype=" STRING" value="sys"/>
```

-continued

```
    <property name="dbpassword" datatype=" STRING"/>
    <property name="dbrole" datatype=" STRING" value="sysdba"/>
    </propertyset>
    <propertyset name="racnodes" type="runtime">
    <tableproperty name="racnode">
    <entry>
    <property name="host" datatype=" STRING"/>
    <property name="port" datatype=" INTEGER"/>
    </entry>
    </tableproperty>
    </propertyset>
    </properties>
    <servicemanagementengine
id="com.oracle.cloudlogic.paas.oracledb.provider">
    <file>
    <location>paas.oracledbprovider.jar</location>
    </file>
    </servicemanagementengine>
</servicedefinition>
```

In accordance with an embodiment, administrative commands can be supported to create service runtimes, for example in the context of a 12c CDB service runtime:

```
padmin register/createproviderruntime sdp OracleDatabase featureset
ORACLE12cDB properties dbhost= cdb1.us.oracle.com:dbport1521:
dbname=
cdb1:dbuser= sys:dbpassword= Oracle123:dbrole= sysdba cdb1
padmin register/createproviderruntime sdp OracleDatabase featureset
ORACLE12cDB properties dbhost= cdb2.us.oracle.com:dbport1521:
dbname=
cdb2:dbuser= sys:dbpassword= Oracle123:dbrole= sysdba cdb2
padmin register/createproviderruntime sdp OracleDatabase featureset
ORACLE12cDB properties
dbhost= cdb3.us.oracle.com:dbport1521: dbname= cdb3:dbuser=
sys:dbpassword= Oracle123:dbrole= sysdba cdb3
```

In accordance with an embodiment, administrative commands can also be supported to create provider types, for example in the context of a 12c CDB service runtime:

```
padmin createprovidertype sdp OracleDatabase runtimes cdb1,cdb2,cdb3
    oracle12cprovidertype
```

Figure 21:
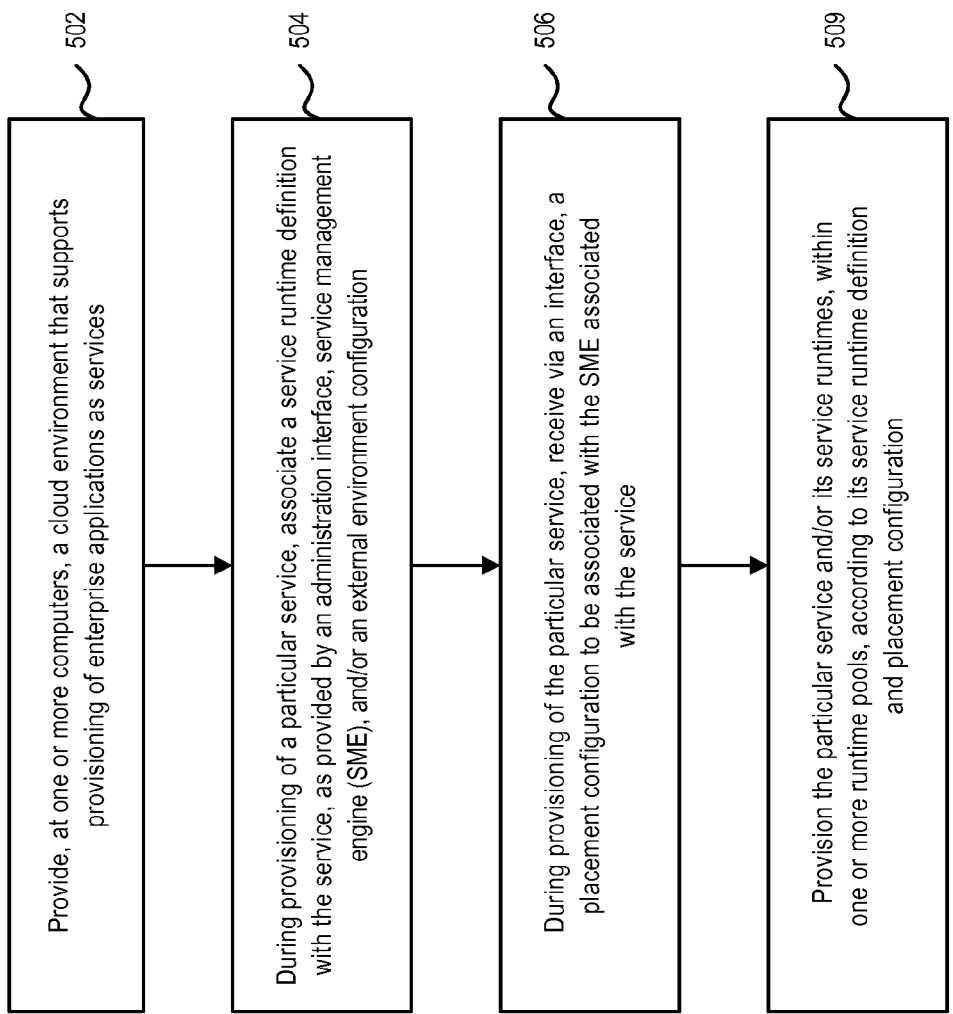
FIG. 21 is a flowchart of a method for using a placement logic to support multitenancy in a PaaS platform or cloud computing environment, in accordance with an embodiment.

FIG. 21 is a flowchart of a method for using a placement logic to support multitenancy in a PaaS platform or cloud computing environment, in accordance with an embodiment. As shown in FIG. 21, in accordance with an embodiment, at step 502, one or more computers are provided with a cloud environment that supports provisioning of enterprise applications as services.

At step 504, during provisioning of a particular service, a service runtime definition is associated with the service, as provided by an administration interface, service management engine (SME), and/or an external environment configuration.

At step 506, during provisioning of the particular service, a placement configuration is received via an interface, to be associated with the SME associated with the service.

At step 509, the particular service and/or its service runtimes are provisioned, within one or more runtime pools, according to its service runtime definition and placement configuration.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, while several of the examples provided above illustrate use with an Oracle 12c CDB service runtime, in accordance with various embodiments, the systems and methods can be used with other types of environments, including other types of service runtime.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing multitenancy support in a platform as a service or cloud computing environment, comprising:
    one or more computers including a cloud computing environment executing thereon;
    a platform component that enables provisioning of services within the cloud computing environment, including providing, for each service type of a plurality of service types, a service definition package that includes information that enables the service type to be provided by the platform component as a service within the cloud computing environment;
    wherein, for a particular service type, the platform component
        receives configuration information from at least one of an administration interface, a service management engine that provisions service instances, or an external environment configuration, to associate a service runtime definition with a service runtime,
        wherein a service management engine associates the service runtime definition with the service runtime, wherein the service runtime is created by the service management engine to match quality of service guarantees associated with a service instance creation request;
    wherein during provisioning of the service runtime, the platform component configures a particular service as a plurality of service instances, according to the service runtime definition associated with the service runtime; and
    wherein the platform component provides access by one or multiple tenants, to the plurality of service instances provided by the service runtime, in accordance with at least one of service isolation, quality of service, or other configuration information of the particular service.

2. The system of claim 1, wherein the service runtime is automatically created by the service management engine upon receipt of a first service instance creation request.

3. The system of claim 2, wherein the service runtime is created by the service management engine to match quality of service guarantees for a later service instance creation request.

4. The system of claim 1, wherein the particular service type configures the platform component to create the plurality of service instances as shares of the service runtime, that is accessible by the one or multiple tenants.

5. The system of claim 1, wherein the plurality of service instances are provided as a plurality of shares of the service runtime, that is accessible by the one or multiple tenants.

6. The system of claim 1, wherein for the particular service, the platform component uses the service management engine to associate the service runtime definition with the service runtime.

7. The system of claim 1, wherein the particular service and its service runtime are provisioned, within one or more runtime pools, according to the service runtime definition and a placement configuration.

8. A method of providing multitenancy support in a platform as a service or cloud computing environment, comprising:
  providing, at one or more computers, a cloud computing environment executing thereon that enables provisioning of services; and
  providing, for each service type of a plurality of service types, a service definition package that includes information that enables the service type to be provided by the platform component as a service within the cloud computing environment;
  providing, for a particular service type, configuration information from at least one of
    an administration interface,
    a service management engine that provisions service instances, or
    an external environment configuration,
    to associate a service runtime definition with a service runtime, wherein a service management engine associates the service runtime definition with the service runtime, wherein the service runtime is created by the service management engine to match quality of service guarantees associated with a service instance creation request;
  during provisioning of the service runtime, configuring a particular service as a plurality of service instances, according to the service runtime definition associated with the service runtime; and
  providing access by one or multiple tenants, to the plurality of service instances provided by the service runtime, in accordance with at least one of service isolation, quality of service, or other configuration information of the particular service.

9. The method of claim 8, wherein the service runtime is automatically created by the service management engine upon receipt of a first service instance creation request.

10. The method of claim 9, wherein the service runtime is created by the service management engine to match quality of service guarantees for a later service instance creation request.

11. The method of claim 8, wherein the particular service type configures the platform component to create the plurality of service instances as shares of the service runtime, that is accessible by the one or multiple tenants.

12. The method of claim 8, wherein the plurality of service instances are provided as a plurality of shares of the service runtime, that is accessible by the one or multiple tenants.

13. The method of claim 8, wherein for the particular service, the platform component uses the service management engine to associate the service runtime definition with the service runtime.

14. The method of claim 8, wherein the particular service and its service runtime are provisioned, within one or more runtime pools, according to the service runtime definition and a placement configuration.

15. A non-transitory computer readable storage medium, including instructions stored thereon which when read and executed by one or more computers cause the one or more computers to perform the steps comprising:
  providing, for each service type of a plurality of service types, a service definition package that includes information that enables the service type to be provided by the platform component as a service within the cloud computing environment;
  providing, for a particular service type, configuration information from at least one of
    an administration interface,
    a service management engine that provisions service instances, or
    an external environment configuration,
    to associate a service runtime definition with a service runtime, wherein a service management engine associates the service runtime definition with the service runtime, wherein the service runtime is created by the service management engine to match quality of service guarantees associated with a service instance creation request;
  during provisioning of the service runtime, configuring a particular service as a plurality of service instances, according to the service runtime definition associated with the service runtime; and
  providing access by one or multiple tenants, to the plurality of service instances provided by the service runtime, in accordance with at least one of service isolation, quality of service, or other configuration information of the particular service.

16. The non-transitory computer readable storage medium of claim 15, wherein the service runtime is automatically created by the service management engine upon receipt of a first service instance creation request.

17. The non-transitory computer readable storage medium of claim 16, wherein the service runtime is created by the service management engine to match quality of service guarantees for a later service instance creation request.

18. The non-transitory computer readable storage medium of claim 15, wherein the particular service type configures the platform component to create the plurality of service instances as shares of the service runtime, that is accessible by the one or multiple tenants.

19. The non-transitory computer readable storage medium of claim 15, wherein the plurality of service instances are provided as a plurality of shares of the service runtime, that is accessible by the one or multiple tenants.

20. The non-transitory computer readable storage medium of claim 15, wherein for the particular service, the platform component uses the service management engine to associate the service runtime definition with the service runtime.

\* \* \* \* \*